United States Patent
Novkov et al.

(10) Patent No.: US 12,485,246 B2
(45) Date of Patent: Dec. 2, 2025

(54) LOW-PROFILE HUMIDIFIER WITH REMOVABLE FLOW CHANNEL

(71) Applicant: Covidien LP, Mansfield, MA (US)

(72) Inventors: Donald J. Novkov, Encinitas, CA (US); Matthew J. Phillips, Carlsbad, CA (US)

(73) Assignee: Covidien LP, Mansfield, MA (US)

( * ) Notice: Subject to any disclaimer, the term of this patent is extended or adjusted under 35 U.S.C. 154(b) by 332 days.

(21) Appl. No.: 18/347,682

(22) Filed: Jul. 6, 2023

(65) Prior Publication Data

US 2024/0024613 A1 Jan. 25, 2024

Related U.S. Application Data

(60) Provisional application No. 63/391,403, filed on Jul. 22, 2022.

(51) Int. Cl.
*A61M 16/10* (2006.01)
*A61M 16/00* (2006.01)
(Continued)

(52) U.S. Cl.
CPC ...... *A61M 16/1095* (2014.02); *A61M 16/022* (2017.08); *A61M 16/208* (2013.01);
(Continued)

(58) Field of Classification Search
CPC ............ A61M 16/1095; A61M 16/022; A61M 16/208; A61M 2205/3331;
(Continued)

(56) References Cited

U.S. PATENT DOCUMENTS 3,987,133 A 10/1976 Andra
4,038,980 A 8/1977 Fodor
(Continued)

FOREIGN PATENT DOCUMENTS

CN 101994677 A 3/2011
CN 206325086 7/2017
(Continued)

OTHER PUBLICATIONS

PCT International Search Report and Written Opinion in International Application PCT/US2019/032136, mailed Aug. 23, 2019, 14 pages.
(Continued)

*Primary Examiner* — Frank M Lawrence, Jr.

(57) ABSTRACT

The disclosed technology relates to low-profile humidifiers for humidifying breathing gases from a medical ventilator. In an example, the low-profile humidifier includes a humidifier body that includes a liquid port; a pump in fluid communication with the liquid port; a valve in fluid communication with the pump; a nozzle in fluid communication with the valve; a controller that controls the valve and the pump. The low-profile humidifier also includes a removable flow channel that is removable from the humidifier body. The removable flow channel includes a gas inlet sized for connection to a conduit from a medical ventilator; a gas outlet; a conduit between the gas inlet and the gas outlet; a heated surface within the conduit to vaporize liquid droplets injected by the nozzle; and a through hole to receive the nozzle into the conduit.

15 Claims, 9 Drawing Sheets

(51) Int. Cl.
*A61M 16/16* (2006.01)
*A61M 16/20* (2006.01)

(52) U.S. Cl.
CPC ............ *A61M 2205/3331* (2013.01); *A61M 2205/3368* (2013.01)

(58) Field of Classification Search
CPC ........ A61M 2205/3368; A61M 11/042; A61M 11/003; A61M 16/0051; A61M 16/0816; A61M 16/0093; A61M 16/1065; A61M 2016/0015; A61M 2205/025; A61M 2205/11; A61M 16/0883; A61M 16/147; A61M 11/008; A61M 11/006; A61M 2016/003; A61M 2205/0238; A61M 2205/18; A61M 2205/3334; A61M 2205/3569; A61M 2205/3584; A61M 2205/3633; A61M 2205/3653; A61M 2205/3666; A61M 2205/584; A61M 16/0875; A61M 16/0833; A61M 2205/364; A61M 2205/505; A61M 2205/6045; A61M 2205/7545; A61M 2205/82; A61M 2209/082; A61M 2209/084; A61M 2209/086; A61M 16/024; A61M 16/109; A61M 16/161; A61M 16/16; B05B 7/0075
USPC ....... 261/127, 129, 131, 139, 142, 115, 116; 128/203.17, 203.26, 203.27, 204.17
See application file for complete search history.

(56) References Cited

U.S. PATENT DOCUMENTS

| | | |
|---|---|---|
| 4,195,044 A | 3/1980 | Miller |
| 4,572,427 A | 2/1986 | Selfridge et al. |
| 4,701,415 A | 10/1987 | Dutton et al. |
| 4,911,157 A | 3/1990 | Miller |
| 4,913,140 A | 4/1990 | Orec et al. |
| 5,062,145 A | 10/1991 | Zwaan et al. |
| 5,170,804 A | 12/1992 | Glassman |
| 5,226,411 A | 7/1993 | Levine |
| 5,367,604 A | 11/1994 | Murray |
| 5,445,143 A | 8/1995 | Sims |
| 5,518,310 A | 5/1996 | Ellman et al. |
| 5,537,996 A | 7/1996 | McPhee |
| 5,537,997 A | 7/1996 | Mechlenburg et al. |
| 5,539,854 A | 7/1996 | Jones et al. |
| 5,588,423 A | 12/1996 | Smith |
| 5,616,115 A | 4/1997 | Gloyd et al. |
| 5,640,951 A | 6/1997 | Huddart et al. |
| 5,655,522 A | 8/1997 | Mechlenburg et al. |
| 5,673,687 A | 10/1997 | Dobson et al. |
| 5,769,071 A | 6/1998 | Turnbull |
| 5,857,062 A | 1/1999 | Bergamaschi et al. |
| 5,862,802 A | 1/1999 | Bird |
| 5,916,493 A * | 6/1999 | Miller .................. A61M 16/16 261/154 |
| D418,498 S | 1/2000 | Leonard |
| 6,019,100 A | 2/2000 | Alving et al. |
| 6,050,260 A | 4/2000 | Daniell et al. |
| 6,102,037 A | 8/2000 | Koch |
| 6,135,432 A | 10/2000 | Hebblewhite et al. |
| 6,256,454 B1 | 7/2001 | Dykes |
| 6,338,473 B1 | 1/2002 | Hebblewhite et al. |
| 6,349,722 B1 | 2/2002 | Gradon et al. |
| 6,397,841 B1 | 6/2002 | Kenyon et al. |
| 6,510,848 B1 | 1/2003 | Gibertoni |
| 6,554,260 B1 | 4/2003 | Lipscombe et al. |
| 6,576,358 B2 | 6/2003 | Gebhardt et al. |
| 6,591,834 B1 | 7/2003 | Colla et al. |
| 6,626,445 B2 | 9/2003 | Murphy et al. |
| 6,669,639 B1 | 12/2003 | Miller et al. |
| 6,694,974 B1 | 2/2004 | Gradon et al. |
| 6,718,974 B1 | 4/2004 | Moberg |
| D492,399 S | 6/2004 | Jenkinson |
| 6,745,768 B2 | 6/2004 | Colla et al. |
| 6,802,314 B2 | 10/2004 | McPhee |
| D498,527 S | 11/2004 | Virr et al. |
| 6,904,911 B2 | 6/2005 | Gibertoni |
| 6,935,337 B2 | 8/2005 | Virr et al. |
| 6,968,841 B2 | 11/2005 | Fini |
| 6,980,419 B2 | 12/2005 | Smith et al. |
| 7,040,317 B2 | 5/2006 | Colla et al. |
| 7,051,733 B2 | 5/2006 | Gradon et al. |
| 7,096,864 B1 | 8/2006 | Mayer et al. |
| 7,106,955 B2 | 9/2006 | Thudor et al. |
| 7,111,624 B2 | 9/2006 | Thudor et al. |
| 7,137,388 B2 | 11/2006 | Virr et al. |
| 7,146,979 B2 | 12/2006 | Seakins et al. |
| D542,900 S | 5/2007 | Snow et al. |
| RE39,724 E | 7/2007 | Gradon et al. |
| D549,321 S | 8/2007 | Snow et al. |
| D549,810 S | 8/2007 | Smith et al. |
| 7,263,994 B2 | 9/2007 | Gradon et al. |
| D555,236 S | 11/2007 | Snow et al. |
| D557,407 S | 12/2007 | Lithgow et al. |
| 7,306,205 B2 | 12/2007 | Huddart et al. |
| D559,371 S | 1/2008 | Snow et al. |
| D559,964 S | 1/2008 | Snow et al. |
| D561,890 S | 2/2008 | Lithgow et al. |
| D561,891 S | 2/2008 | Lithgow et al. |
| 7,335,157 B2 | 2/2008 | Czupich et al. |
| D569,958 S | 5/2008 | Snow et al. |
| 7,413,173 B2 | 8/2008 | DiMatteo et al. |
| D576,263 S | 9/2008 | Snow et al. |
| D579,537 S | 10/2008 | Smith et al. |
| 7,552,730 B2 | 6/2009 | Kates |
| 7,594,668 B2 | 9/2009 | Arceta et al. |
| 7,802,569 B2 | 9/2010 | Yeates et al. |
| 8,074,645 B2 | 12/2011 | Bordewick et al. |
| 8,220,463 B2 | 7/2012 | White et al. |
| 8,333,195 B2 | 12/2012 | Cortez, Jr. et al. |
| 8,448,641 B2 | 5/2013 | Jafari |
| 8,522,782 B2 | 9/2013 | Lewis et al. |
| 8,671,936 B2 | 3/2014 | Meier |
| 8,720,439 B1 | 5/2014 | Kolkowski et al. |
| 8,720,442 B2 | 5/2014 | Perine |
| 8,844,526 B2 | 9/2014 | Jafari |
| 8,905,024 B2 | 12/2014 | Jafari |
| 8,939,150 B2 | 1/2015 | Jourdain |
| 8,950,398 B2 | 2/2015 | Andrieux |
| 8,973,577 B2 | 3/2015 | Jafari |
| 8,978,650 B2 | 3/2015 | Jafari |
| 9,022,031 B2 | 5/2015 | Nakai |
| 9,027,552 B2 | 5/2015 | Angelico |
| 9,030,304 B2 | 5/2015 | Milne |
| 9,072,848 B2 | 7/2015 | Bertinetti et al. |
| 9,089,665 B2 | 7/2015 | Patel |
| 9,114,220 B2 | 8/2015 | Masic |
| 9,126,001 B2 | 9/2015 | Masic |
| 9,144,658 B2 | 9/2015 | Li |
| 9,205,221 B2 | 12/2015 | Winter |
| 9,254,369 B2 | 2/2016 | Jourdain |
| 9,262,588 B2 | 2/2016 | Skidmore |
| 9,269,990 B2 | 2/2016 | Andrieux |
| 9,289,573 B2 | 3/2016 | Platt |
| 9,327,089 B2 | 5/2016 | Jafari |
| 9,358,355 B2 | 6/2016 | Graboi |
| 9,358,358 B2 | 6/2016 | Wondka et al. |
| 9,364,626 B2 | 6/2016 | Carter |
| 9,375,542 B2 | 6/2016 | Doyle |
| 9,381,314 B2 | 7/2016 | Thiessen |
| 9,387,297 B2 | 7/2016 | Leone |
| 9,411,494 B2 | 8/2016 | Baker, Jr. |
| 9,414,769 B2 | 8/2016 | Karst |
| 9,421,338 B2 | 8/2016 | Jafari |
| 9,492,629 B2 | 11/2016 | Sanchez |
| 9,649,458 B2 | 5/2017 | Andrieux |
| 9,675,771 B2 | 6/2017 | Jafari |
| 9,757,270 B2 | 9/2017 | Carrubba |
| 9,808,591 B2 | 11/2017 | Esmaeil-zadeh-azar |
| 9,820,681 B2 | 11/2017 | Baker, Jr. |

(56) References Cited

U.S. PATENT DOCUMENTS

| | | | |
|---|---|---|---|
| 9,878,120 B2 | 1/2018 | White et al. |
| 9,925,345 B2 | 3/2018 | Masic |
| 9,925,346 B2 | 3/2018 | Dong et al. |
| 9,950,129 B2 | 4/2018 | Glenn |
| 9,950,135 B2 | 4/2018 | Winter |
| 9,956,363 B2 | 5/2018 | Masic |
| 9,980,943 B2 | 5/2018 | Burkin |
| 9,981,096 B2 | 5/2018 | Sanchez |
| 9,987,457 B2 | 6/2018 | Winter |
| 9,993,604 B2 | 6/2018 | Doyle |
| 10,029,057 B2 | 7/2018 | Jafari |
| 10,046,128 B2 | 8/2018 | Hill et al. |
| 10,064,583 B2 | 9/2018 | Nakai |
| 10,076,838 B1 | 9/2018 | Martinez |
| 10,149,952 B2 | 12/2018 | Bertinetti et al. |
| 10,206,429 B2 | 2/2019 | Davis et al. |
| 10,207,068 B2 | 2/2019 | Jafari |
| 10,279,140 B2 | 5/2019 | Winski |
| 10,362,967 B2 | 7/2019 | Milne |
| 10,426,261 B2 | 10/2019 | Theis |
| 10,449,322 B2 | 10/2019 | Poormand |
| 10,453,572 B1 | 10/2019 | Brooks |
| 10,463,819 B2 | 11/2019 | Jourdain |
| 10,493,225 B2 | 12/2019 | Thiessen |
| 10,543,326 B2 | 1/2020 | Doyle |
| 10,543,327 B2 | 1/2020 | Jafari |
| 10,582,880 B2 | 3/2020 | Sanborn |
| 10,596,343 B2 | 3/2020 | Glenn |
| 10,617,299 B2 | 4/2020 | Sanchez |
| 10,639,441 B2 | 5/2020 | Graboi |
| 10,646,033 B2 | 5/2020 | Lindblad |
| 10,668,239 B2 | 6/2020 | Kimm |
| 10,709,854 B2 | 7/2020 | Jafari |
| 10,749,359 B2 | 8/2020 | Ross |
| 10,806,879 B2 | 10/2020 | Doyle |
| 10,828,437 B2 | 11/2020 | Masic |
| 10,842,443 B2 | 11/2020 | Nakai |
| 10,850,056 B2 | 12/2020 | Masic |
| 10,864,336 B2 | 12/2020 | Esmaeil-zadeh-azar |
| 10,940,281 B2 | 3/2021 | Glenn |
| 11,027,080 B2 | 6/2021 | Jafari |
| 11,033,700 B2 | 6/2021 | Jourdain |
| 11,173,271 B2 | 11/2021 | Glenn |
| 11,229,759 B2 | 1/2022 | Doyle |
| 11,235,114 B2 | 2/2022 | Jafari |
| 11,254,340 B2 | 2/2022 | Wright |
| 11,344,689 B2 | 5/2022 | Thiessen |
| 11,478,594 B2 | 10/2022 | Li |
| 11,478,596 B2 | 10/2022 | McGann |
| 11,497,869 B2 | 11/2022 | Jafari |
| 11,517,691 B2 | 12/2022 | Thiessen |
| 11,554,230 B2 | 1/2023 | Angelico |
| 11,559,641 B2 | 1/2023 | Graboi |
| 11,559,643 B2 | 1/2023 | Sanborn |
| 11,613,286 B2 | 3/2023 | Wright |
| 11,638,796 B2 | 5/2023 | Masic |
| 11,642,042 B2 | 5/2023 | Milne |
| 2002/0017298 A1 | 2/2002 | Koch |
| 2002/0083947 A1 | 7/2002 | Seakins |
| 2002/0129815 A1 | 9/2002 | McPhee |
| 2003/0079748 A1 | 5/2003 | Seakins |
| 2004/0074493 A1 | 4/2004 | Seakins et al. |
| 2004/0079370 A1 | 4/2004 | Gradon et al. |
| 2004/0182386 A1 | 9/2004 | Meier |
| 2004/0186357 A1 | 9/2004 | Soderberg |
| 2004/0226561 A1 | 11/2004 | Colla et al. |
| 2004/0229089 A1 | 11/2004 | Preidel et al. |
| 2004/0262867 A1 | 12/2004 | Arceta |
| 2005/0178383 A1 | 8/2005 | Mackie et al. |
| 2005/0288571 A1 | 12/2005 | Perkins et al. |
| 2006/0037613 A1 | 2/2006 | Kwok et al. |
| 2006/0130836 A1 | 6/2006 | Wixey et al. |
| 2006/0137687 A1 | 6/2006 | Colla et al. |
| 2006/0144395 A1 | 7/2006 | Koch et al. |
| 2006/0163829 A1 | 7/2006 | Livengood |
| 2006/0231097 A1 | 10/2006 | Dougherty et al. |
| 2006/0237005 A1 | 10/2006 | Virr et al. |
| 2007/0132117 A1 | 6/2007 | Pujol et al. |
| 2007/0157928 A1 | 7/2007 | Pujol et al. |
| 2008/0072900 A1 | 3/2008 | Kenyon et al. |
| 2008/0072904 A1 | 3/2008 | Becker et al. |
| 2008/0084147 A1 | 4/2008 | Brown |
| 2008/0216829 A1 | 9/2008 | Koch et al. |
| 2008/0236577 A1 | 10/2008 | Power |
| 2008/0252045 A1 | 10/2008 | Rossini |
| 2008/0302361 A1 | 12/2008 | Snow et al. |
| 2008/0302362 A1 | 12/2008 | Kwok |
| 2009/0000620 A1 | 1/2009 | Virr |
| 2009/0212744 A1 | 8/2009 | Werthman |
| 2012/0138050 A1* | 6/2012 | Wondka ........... A61M 16/0057 128/203.14 |
| 2016/0228282 A1 | 8/2016 | Carrubba |
| 2016/0243324 A1 | 8/2016 | Doyle |
| 2016/0250427 A1 | 9/2016 | Jafari |
| 2016/0256643 A1 | 9/2016 | Graboi |
| 2016/0256656 A1 | 9/2016 | Glenn |
| 2016/0354566 A1 | 12/2016 | Thiessen |
| 2017/0095627 A1 | 4/2017 | Jafari |
| 2017/0164872 A1 | 6/2017 | Sanborn |
| 2017/0182269 A1 | 6/2017 | Masic |
| 2017/0296765 A1 | 10/2017 | Dong |
| 2018/0036500 A1 | 2/2018 | Esmaeil-zadeh-azar |
| 2018/0193578 A1 | 7/2018 | Glenn |
| 2018/0207378 A1 | 7/2018 | Masic |
| 2018/0207379 A1 | 7/2018 | Masic |
| 2018/0325459 A1 | 11/2018 | Nakai |
| 2019/0255268 A1 | 8/2019 | Kimm |
| 2020/0108215 A1 | 4/2020 | Nakai |
| 2020/0178841 A1 | 6/2020 | Sanborn |
| 2020/0254202 A1 | 8/2020 | Kimm |
| 2020/0297950 A1 | 9/2020 | Jafari |
| 2021/0052839 A1 | 2/2021 | Li |
| 2021/0097891 A1 | 4/2021 | Ginani |
| 2021/0145308 A1 | 5/2021 | Glenn |
| 2021/0290883 A1 | 9/2021 | Dong |
| 2021/0298635 A1 | 9/2021 | Addison |
| 2021/0299375 A1 | 9/2021 | Jenaro |
| 2021/0316094 A1 | 10/2021 | Kimm |
| 2021/0316104 A1 | 10/2021 | Novkov |
| 2021/0316105 A1 | 10/2021 | Godara |
| 2021/0322691 A1 | 10/2021 | Dong |
| 2021/0393901 A1 | 12/2021 | Phillips |
| 2021/0393902 A1 | 12/2021 | Dong |
| 2022/0031992 A1 | 2/2022 | Glenn |
| 2022/0054666 A1 | 2/2022 | Phillips |
| 2022/0080140 A1 | 3/2022 | Li |
| 2022/0096764 A1 | 3/2022 | Li |
| 2022/0096781 A1 | 3/2022 | Dong |
| 2022/0134030 A1 | 5/2022 | Jenaro |
| 2022/0135099 A1 | 5/2022 | Wright |
| 2022/0193363 A1 | 6/2022 | Novkov |
| 2022/0198219 A1 | 6/2022 | Novkov |
| 2022/0242471 A1 | 8/2022 | Wright |
| 2022/0401688 A1 | 12/2022 | Gleim |
| 2022/0409836 A1 | 12/2022 | Li |
| 2023/0030766 A1 | 2/2023 | Jenaro |
| 2023/0059908 A1 | 2/2023 | Jenaro |
| 2023/0078506 A1 | 3/2023 | Dong |
| 2024/0181197 A1 | 6/2024 | Novkov |

FOREIGN PATENT DOCUMENTS

| | | |
|---|---|---|
| CN | 107106808 A | 8/2017 |
| FR | 2966048 | 4/2015 |
| WO | 2012080923 | 6/2012 |
| WO | 2015/033288 A1 | 3/2015 |
| WO | 2016/036260 A1 | 3/2016 |
| WO | 2017/131966 A1 | 8/2017 |

OTHER PUBLICATIONS

Chen et al., "Influence of Geometric Features on the Performance of Pressure-Swirl Atomizers", Journal of Engineering for Gas Turbines and Power, Oct. 1990, vol. 112, pp. 579-582.

(56) References Cited

OTHER PUBLICATIONS

Rizk, N.K. et al., "Influence of Liquid Properties on the Internal Flow Characteristics of Simplex Swirl Atomizers" Atomization and Spray Technology 2 (1986), pp. 219-232.

Chen, S.K. et al., "Factors Influencing the Effective Spray Cone Angle of Pressure-Swirl Atomizers" Journal of Engineering for Gas Turbines and Power, Jan. 1992, vol. 114, pp. 97-103.

Dodge, L.G. et al., "Effect of Elevated Temperature and Pressure on Sprays From Simplex Swirl Atomizers", Journal of Engineering for Gas Turbines and Power, Jan. 1986, vol. 108, pp. 209-215.

Zhao, Y.H. et al., "Experimental and Analytical Investigation on the Variation of Spray Characteristics Along Radial Distance Downstream of a Pressure Swirl Atomizer", Journal of Engineering for Gas Turbines and Power, Jan. 1986, vol. 108, pp. 473-478.

Babu, K. Ranganadha, et al., "Design of Swirl Chamber Atomisers", International Conference on Liquid Atomisation & Spray Systems, V1, 1985, pp. 1-7.

Chin, J.S. et al., "Influence of Downstream Distance on the Spray Characteristics of Pressure-Swirl Atomizers", Journal of Engineering for Gas Turbines and Power, Jan. 1986, vol. 108, pp. 219-224.

Spalding, D. Brian, "Computational Fluid Dynamics and Its Application to Liquid-Atomisation and Spray Systems", International Conference on Liquid Atomisation & Spray Systems, V2, 1985, pp. 1-6.

Rizk, N.K. et al., "Prediction of Velocity Coefficient and Spray Cone Angle for Simplex Swirl Atomizers", International Conference on Liquid Atomisation & Spray Systems, V1, 1985, pp. 1-16.

Doble, S. M., "Design of Centrifugal Spray Nozzles for Outputs up to 1,800 gallons per hour", Proceedings of the Institute of Mechanical Engineers, vol. 157 (1947), pp. 103-119.

Zhao, Y.H. et al., "Dropsize Distributions from Swirl and Airblast Atomizers", Atomization and Spray Technology 2, 1986, pp. 3-15.

7200 Series Ventilator, Options, and Accessories: Operator's Manual. Nellcor Puritan Bennett, Part No. 22300 A, Sep. 1990, pp. 1-196.

7200 Ventilatory System: Addendum/Errata. Nellcor Puritan Bennett, Part No. 4-023576-00, Rev. A, Apr. 1998, pp. 1-32.

800 Operator's and Technical Reference Manual. Series Ventilator System, Nellcor Puritan Bennett, Part No. 4-070088-00, Rev. L, Aug. 2010, pp. 1-476.

840 Operator's and Technical Reference Manual. Ventilator System, Nellcor Puritan Bennett, Part No. 4-075609-00, Rev. G, Oct. 2006, pp. 1-424.

Puritan Bennett 980 Series Ventilator Operator's Manual, Covidien, Jan. 29, 2014, Part. No. 10077893 A Jan. 2014, 506 pages.

Chinese Office Action for CN Application No. 201980032217.1 mailed May 5, 2022 (10 pages).

\* cited by examiner

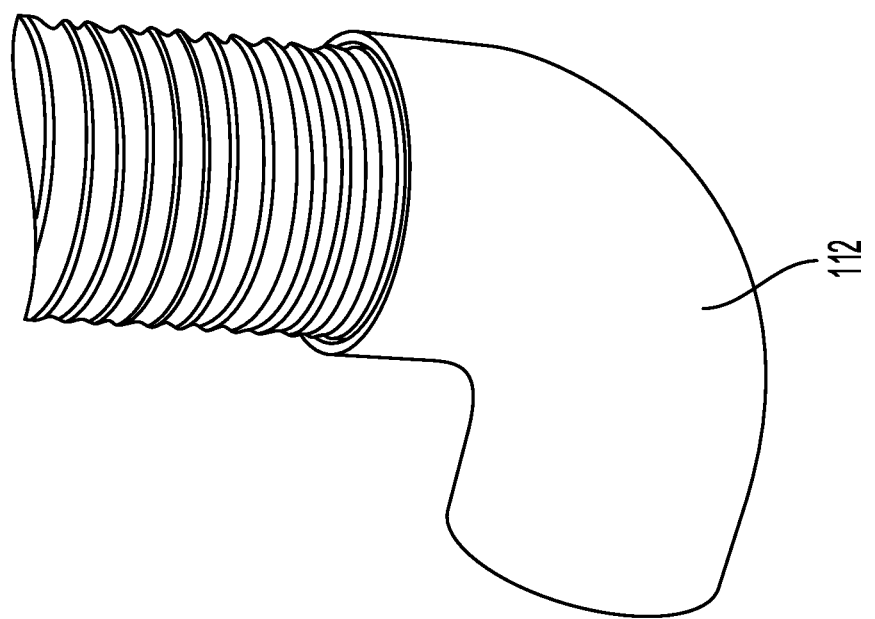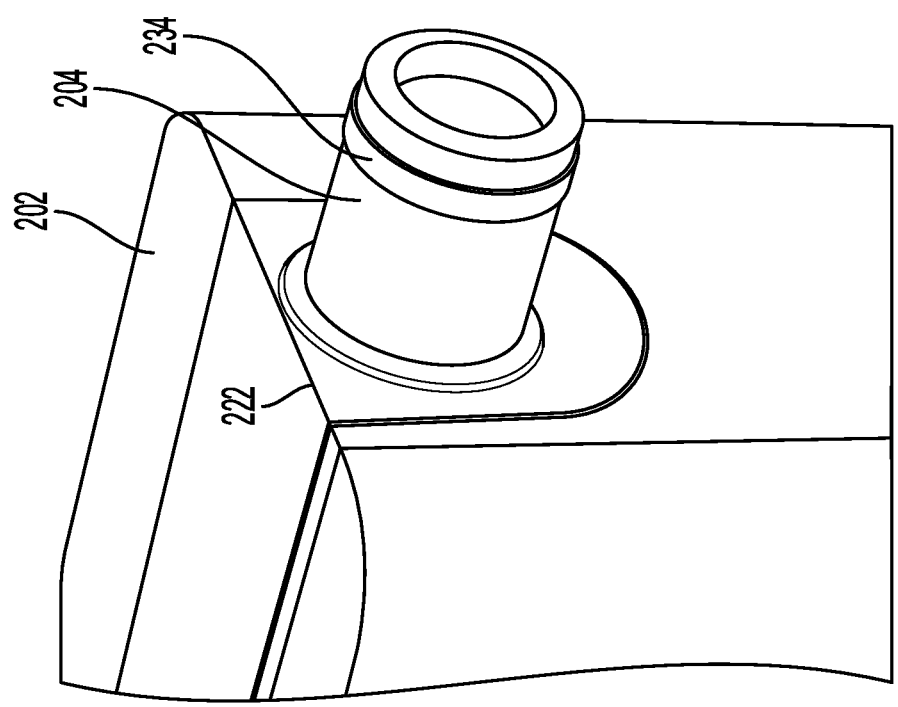
FIG. 4

LOW-PROFILE HUMIDIFIER WITH REMOVABLE FLOW CHANNEL

CROSS-REFERENCE TO RELATED APPLICATIONS

This application claims the benefit of U.S. Provisional Application No. 63/391,403 filed Jul. 22, 2022, titled "Low-Profile Humidifier with Removable Flow Channel," which is incorporated herein by reference in its entirety.

INTRODUCTION

Medical ventilator systems are used to provide ventilatory and supplemental oxygen support to patients. These ventilators typically comprise a connection for pressurized gas (air, oxygen) that is delivered to the patient through a conduit or tubing. Some ventilators are used with humidifiers to humidify the gas delivered to the patient to improve patient adherence and comfort.

It is with respect to this general technical environment that aspects of the present technology disclosed herein have been contemplated. Furthermore, although a general environment is discussed, it should be understood that the examples described herein should not be limited to the general environment identified herein.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an aspect, the disclosed technology relates to a low-profile humidifier for humidifying breathing gases from a medical ventilator. The low-profile humidifier includes a humidifier body that includes a liquid port; a pump in fluid communication with the liquid port; a valve in fluid communication with the pump; a nozzle in fluid communication with the valve; a controller that controls the valve and the pump. The low-profile humidifier also includes a removable flow channel that is removable from the humidifier body. The removable flow channel includes a gas inlet sized for connection to a conduit from a medical ventilator; a gas outlet; a conduit between the gas inlet and the gas outlet; a heated surface within the conduit to vaporize liquid droplets injected by the nozzle; and a through hole to receive the nozzle into the conduit.

In an example, a top surface of the removable flow channel forms a portion of a top surface of the humidifier body. In another example, the removable flow channel aligns with the humidifier body asymmetrically. In yet another example, the gas outlet comprises a color indicator of a first color and the gas inlet comprises a color indicator of a second color. In still another example, the removable flow channel is rigid, opaque, and elongate. In yet another example, the humidifier body includes a front planar surface, and wherein a display is included in the front planar surface. In still yet another example, the liquid port is located within an indentation in a lower corner of the humidifier body such that a liquid tube coupled to the liquid port extends downward or away from the humidifier body.

In another aspect, the disclosed technology relates to a low-profile humidifier for humidifying breathing gases from a medical ventilator. The low-profile humidifier includes a humidifier body that includes a housing having a front planar surface, a first side planar surface, a second side planar surface, and a top planar surface, wherein the housing has a volume of less than 150 cubic inches; a liquid port couplable to a fluid connector; a pump fluidly in fluid communication with the liquid port; a valve fluidly in fluid communication with the pump; and a nozzle in fluid communication with the valve. The low-profile humidifier also includes a removable flow channel that is removable from the humidifier body. The removable flow channel includes a conduit; a heated surface to vaporize liquid droplets injected by the nozzle; and a through hole to receive the nozzle.

In an example, the removable flow channel further comprises at least one of a flow sensor, a temperature sensor, or a humidity sensor. In another example, a top surface of the removable flow channel includes an arrow indicting a direction of flow of breathing gases through the removable flow channel. In yet another example, the low-profile humidifier further includes a removable expiratory heat-boost flow channel including an exhaled gases inlet and an exhaled gases outlet. In still another example, the liquid port is located within an indentation in a lower corner of the humidifier body such that a liquid tube coupled to the liquid port extends downward or away from the humidifier body. In a further example, a top surface of the removable flow channel is parallel with the top planar surface of the humidifier body. In yet another example, the removable flow channel includes a gas inlet protruding from the first side planar surface and a gas outlet protruding from the second side planar surface. In still yet another example, the second side planar surface includes an inspiratory electrical port receive a data and heater wire cable for an inspiratory conduit.

It is to be understood that both the foregoing general description and the following Detailed Description are explanatory and are intended to provide further aspects and examples of the disclosure as claimed.

BRIEF DESCRIPTION OF THE DRAWINGS

The following drawing figures, which form a part of this application, are illustrative of aspects of systems and methods described below and are not meant to limit the scope of the disclosure in any manner, which scope shall be based on the claims.

FIG. 4 depicts another side of the example low-profile humidifier.

Figure 1:
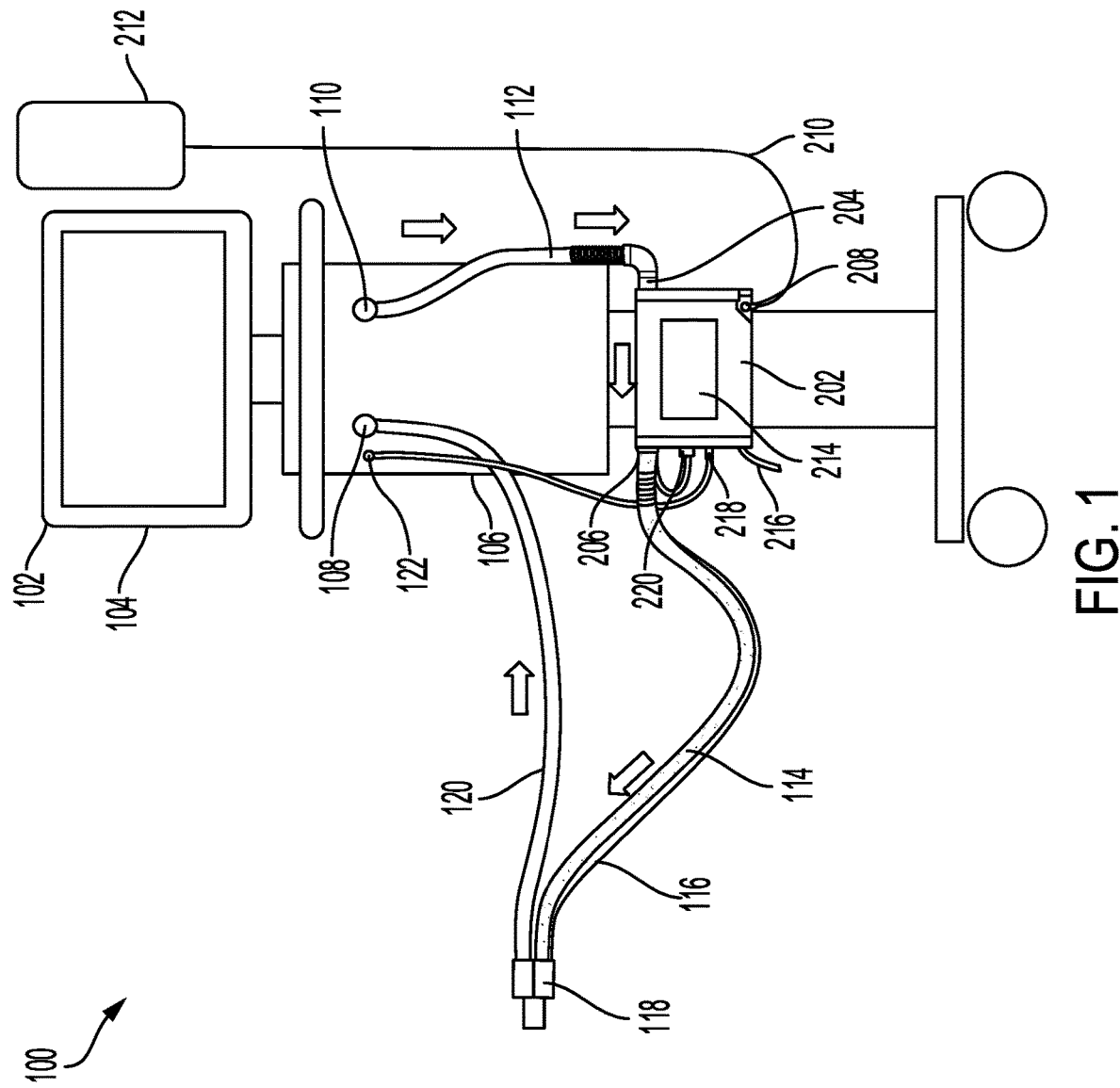
FIG. 1 depicts a diagram illustrating an example of a medical ventilation system with a low-profile humidifier.

While examples of the disclosure are amenable to various modifications and alternative forms, specific aspects have been shown by way of example in the drawings and are described in detail below. The intention is not to limit the scope of the disclosure to the particular aspects described. On the contrary, the disclosure is intended to cover all modifications, equivalents, and alternatives falling within the scope of the disclosure and the appended claims.

DETAILED DESCRIPTION

Although the techniques introduced above and discussed in detail below may be implemented for a variety of medical devices, the present disclosure will discuss the implementation of these techniques in the context of a medical ventilator for use in providing ventilation support to a human patient. A person of skill in the art will understand that the technology described in the context of a medical ventilator for human patients could be adapted for use with other systems such as ventilators for non-human patients and general gas transport systems.

Medical ventilators are used to provide breathing gases to a patient who may otherwise be unable to breathe sufficiently. In modern medical facilities, pressurized air and oxygen sources are often available from wall outlets. Accordingly, ventilators may provide pressure regulating valves (or regulators) connected to centralized sources of pressurized air and pressurized oxygen. The regulating valves function to regulate flow so that respiratory gases having a desired concentration of oxygen are supplied to the patient at desired pressures and rates. Ventilators capable of operating independently of external sources of pressurized air are also available.

While operating a ventilator, it is desirable to control the percentage of oxygen in the gases supplied by the ventilator to the patient. Further, some ventilators are used with humidifiers to humidify the breathing gases delivered to the patient to improve patient adherence and comfort. However, some humidifiers often over humidify the delivered breathing gases leading to an accumulation of water in the patient circuit or within the lungs of patient, referred to herein as "rainout." The accumulated water in the patient circuit can interfere with circuit sensors and/or filters and can increase the chances of patient infection, such as pneumonia. Accordingly, the accumulated water must be removed or cleared from the patient circuit, and over-humidification leading to rainout is problematic with current ventilator humidifiers. Low humidification is also problematic, particularly in low-gas flow ventilator operating conditions, because under humidification for prolonged periods can result in airway damage due to dryness and other patient harm.

Humidifiers that may be more prone to rainout generally include a reservoir of water and a large heating plate that heats the reservoir of water. As the reservoir of water is heated, the evaporated water flows into the patient circuit to humidify the gas that is being delivered to the patient. In such systems, the amount of humidification introduced into the circuit is directly tied with amount of heat introduced by heating plate. That is, the amount of water introduced into the patient circuit cannot be separately controlled from the amount of heat introduced into the patient circuit.

Accordingly, the current disclosure describes systems and methods for humidifying ventilator delivered breathing gases that reduces and/or prevents rainout. The present technology directly controls the amount of water or liquid that is injected into the breathing circuit, which helps prevent rainout from over-humidification. More specifically, the present technology injects a pressurized liquid through a nozzle. The pressurized liquid may be injected in a variety of patterns, including a jet, a full cone, a hollow cone, a fan shape, etc. The liquid may be injected as a stream or as atomized droplets. The pressurized liquid is injected such that it impinges a heated surface, protruding into a conduit carrying breathing gases, that evaporates the injected liquid. The water vapor then mixes with breathing gases to form humidified breathing gases that are carried to the patient through the remainder of the breathing circuit.

In addition, the injection-based humidifier is provided in a low-profile configuration. The low-profile configuration provides for minimal protrusion when the humidifier is attached to other devices or fixtures, such as a ventilator. The low-profile configuration may also include a removable flow channel that allows for the gas flow channel to be cleaned and/or replaced. For instance, in some examples, the removable flow channel may be sterilizable. The low-profile humidifier also includes a large display screen to visually indicate the operation of the humidifier. Additional improvements are also incorporated into the humidifier that protect the operation of the humidifier, such as watershed designs to encourage any dripping water to flow away from the electronics housed within the humidifier. Additional advantages and benefits of the present technology will be appreciated from the following discussion.

FIG. 1 depicts a diagram illustrating an example of a medical ventilation system 100. The medical ventilation system 100 includes a ventilator 102 that provides positive pressure ventilation to a patient. The ventilator 102 includes a display 104 and a pneumatic system 106 (also referred to as a pressure generating system) for circulating breathing gases to and from the patient. The breathing gases generated by the ventilator 102 are provided from an inspiratory port 110 and through a first segment of an inspiratory conduit 112.

The breathing gases are then received by a low-profile humidifier 202 where the low-profile humidifier 202 humidifies the breathing gases to form humidified breathing gases. The humidified breathing gases exit the humidifier and travel through a second segment of an inspiratory conduit 114. The second segment of the inspiratory conduit 114 extends from the low-profile humidifier 202 to a wye connector 118 in the dual limb example that is depicted. The wye connector 118 is then coupled to a patient interface to provide the humidified breathing gases to the patient. The inspiratory conduit 114 may be jacketed and/or heated by a heating coil or other heating elements.

The patient-end of the inspiratory conduit 114 or the wye connector 118 may also include a temperature sensor and/or humidity sensor, among other potential sensors. Measurements and/or signals from the sensors at the patient side of the inspiratory conduit 114 and/or the wye connector 118 may be provided to the humidifier via a communication wire 116.

The gases that are exhaled by the patient flow back through the wye connector 118 and through an expiratory conduit 120 that extends from the wye connector 118 to an expiratory port 108 of the ventilator 102. The ventilator 102 may then filter the exhaled gases and exhaust the exhaled gases. In other examples, a single limb ventilation system may be utilized where no wye connector 118 or expiratory components are incorporated into the ventilation system 100.

The low-profile humidifier 202 includes a display 214 on a front panel of low-profile humidifier 202. The display 214 may be a touch-screen display that displays information about the humidification being provided by the low-profile humidifier 202, and the touch-screen display 214 may also receive inputs to modify the humidification settings that control the humification of the breathing gases flowing through the low-profile humidifier 202. For instance, the temperature of the breathing gases and the humidity of the breathing gases may be displayed, and the corresponding settings may be altered via interaction with the touch-screen display 214.

The low-profile humidifier 202 receives liquid for humidifying the breathing gases from a liquid reservoir 212. In the example depicted, the liquid reservoir 212 is a bag of liquid that may be mounted to a pole or other structure. The liquid in the liquid reservoir 212 flows through a liquid tube 210 and through a liquid connector 208 that is removably couplable to a port on a lower-corner of the low-profile humidifier 202.

The low-profile humidifier 202 also includes in gas inlet 204 and a gas outlet 206. The inspiratory conduit 112 is removably attachable to the gas inlet 204. Thus, the gases from the ventilator 102 flow through the inspiratory conduit 112 and into the low-profile humidifier 202 via the gas inlet 204. The inspiratory conduit 114 is removably attachable to the gas outlet 206. Thus, the humidified breathing gases flow from the low-profile humidifier 202 and into the inspiratory conduit 114 via the gas outlet 206.

The low-profile humidifier 202 also includes multiple electrical connections. Power is provided to the low-profile humidifier 202 via a power cord 216. The power cord 216 may be plugged into wall power or another source of power. For instance, in some examples, the power cord 216 may plug into the ventilator 102 to receive power from the ventilator 102.

A data and heater wire cable 220 electrically couples the heater wire of the inspiratory conduit 114 and the temperature and/or humidity sensors positioned at the end of the inspiratory conduit 114 or in the wye connector 118. For instance, heater-wire control signals generated by the low-profile humidifier 202 are transmitted to the heater wire of the inspiratory conduit 114 via the data and heater wire cable 220. Sensor readings or measurements are also received by the low-profile humidifier 202 via the data and heater wire cable 220. While the heater wires discussed herein are generally discussed as a heater wire for the respective conduits or segments, the heater wire may include multiple wires. For instance, the heater wire may include a first heater wire (e.g., a positive wire) and a second heater wire (e.g., a negative wire) to allow for current to flow through the heater wire. Additional wires connected to a thermistor in the respective conduits may also be included and electrically connected to the humidifier 202. For instance, the wires connected to the thermistor allow for data from the thermistor to be received. In some examples, the thermistor(s) measure the heater wire temperature measured close to but not touching the heater wire (e.g., separated by a small distance or thickness of the conduit).

An expiratory heater cable 218 electrically couples a heater wire of the expiratory conduit 120 to the low-profile humidifier 202 so that the low-profile humidifier 202 can control the heat generated by the heater wire. In the example depicted, the expiratory heater cable 218 connects to the ventilator 102 at an electrical port 122. The ventilator 102 may pass heater wire control signals from the low-profile humidifier 202 to the heater wire of the expiratory conduit 120. Where the expiratory heater cable 218 connects the ventilator 102, the expiratory heater cable 218 may also provide data from the ventilator 102 to the low-profile humidifier 202.

Figure 2:
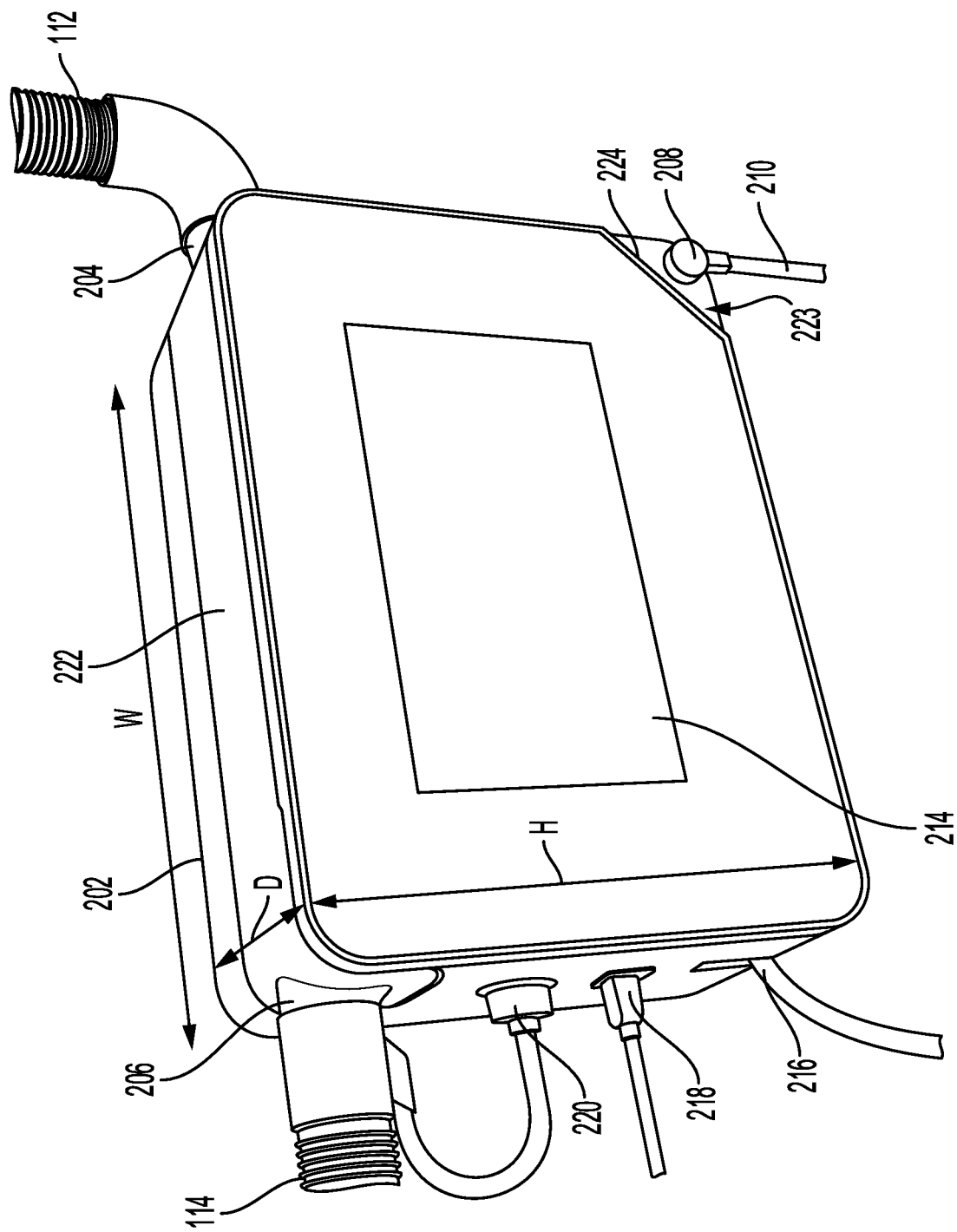
FIG. 2 depicts an example low-profile humidifier.

FIG. 2 depicts an example low-profile humidifier 202. The example low-profile humidifier 202 is generally rectangular with planar sides having rounded corners. For instance, the low-profile humidifier 202 includes a front planar surface, a first side (e.g., left side) planar surface, a second side (e.g., right side) planar surface, and a top planar surface A front face of the low-profile humidifier 202 includes the display 214. The display 214 may occupy at least 25-50% percent the surface area of the front face of the low-profile humidifier 202. The flat planar front face, which is vertical when the low-profile humidifier 202 is mounted vertically, may help shed water or other liquids that come into contact with the front face. When the display 214 is also generally vertical, which is allows for potentially better viewing and viewing angles of the display 214, which differs from traditional humidifiers.

The low-profile humidifier 202 has dimensions that are relatively small to provide for a compact humidification solution that may be directly mounted to structures, such as a ventilator, without significantly protruding out from such structures. With traditional humidifiers that utilize an open pool of water, such humidifiers require a flat, level surface to operate, and such surfaces often require significant protrusions from the structure on which they are mounted. When moving the mounting structures, the humidifiers may be knocked into other obstructions or obstacles. The compact dimensions of the low-profile humidifier 202 help prevent such interference. The compact shape also allows for covers, such as silicone covers, or other protective elements to more easily be added to the low-profile humidifier to add additional protection and durability.

The low-profile humidifier 202 housing includes a height (H), width (W), and a depth (D). The height is measured from the bottom planar surface to the top planar surface. The width is measured from the left planar surface to the right planar surface. The depth is measured from the back planar surface to the front planar surface. The depth (D) of the low-profile humidifier 202 may be less than 5 inches or less than 3 inches. The height (H) may be less than 7 inches or 5 inches. The width (W) may be less than 10 inches or 8 inches. Accordingly, the volume of the low-profile humidifier 202 may be between about 100 cubic inches and 300 cubic inches. In some examples, the low-profile humidifier 202 housing has a volume of less than 150 cubic inches. The narrow depth of the low-profile humidifier is made possible in part due to the fact that the low-profile humidifier 202 does not need to include a reservoir of heated water, such as is required with traditional humidifiers that heat an open reservoir of water. Such reservoirs require additional surface area for the water to evaporate, and such reservoirs are also prone to splashing upon movement.

The humidifier also includes a watershed feature 223, as shown in FIG. 2. In an embodiment, the watershed feature 223 includes a recess or indentation 224 for receiving the liquid connector 208 can also be seen in FIG. 2. In the example depicted, the indentation 224 is chevron indentation in the front face of the low-profile humidifier 202. Additional details of the indentation are discussed below with reference to FIG. 5.

A removable flow channel 222 is provided at the top of the low-profile humidifier 202. The removable flow channel 222 includes the flow channel (e.g., tube) through which the breathing gases flow. The removable flow channel 222 includes the gas inlet 204 and the gas outlet 206, and a top surface of the removable flow channel 222 forms a part of the top surface of the low-profile humidifier 202. Because the removable flow channel 222 may be removed from the low-profile humidifier 202, the removable flow channel 222 may be cleaned between uses. For instance, the removable flow channel 222 may be autoclavable or otherwise sterilizable. In some examples, the removable flow channel 222 may also include some disposable elements such as plastic or disposable conduits within the removable flow channel 222. Because the removable flow channel 222 is the only portion of the low-profile humidifier 202 that needs to be sterilized between uses, the ability to remove the removable flow channel 222 provides a way to effectively sterilize the humidifier 202 without having to expose any of the electronics of the low-profile humidifier 202 to sterilization procedures.

In an embodiment, the removable flow channel 222 is a rigid component. The tube within the removable flow channel 222 extending from the gas inlet 204 to the gas outlet 206 may also be straight, rather than curved or bent. As such, the breathing gases that enter through the gas inlet 204 flow directly through the removable flow channel 222 and out the gas outlet 206. The removable flow channel 222 is also opaque. Additional details regarding an example removable flow channel 222 are provided below with respect to FIGS. 6 and 8A-8B.

With a straight, rigid tube as the flow channel, flow of the gases through the humidifier 202 may generally be improved. For instance, in other humidifiers, gases flow through the humidifier with many twists or turns, which cause turbulence in the flow of breathing gases and can also lead to less accuracy of the flow delivered. With the straight flow channel of the low-profile humidifier 202, the breathing gases are generally unimpeded when flowing through the flow channel due to the lack of twists, bends, curves, dips, etc. For instance, a curved pipe or tube generally provides a higher resistance to flow than a curved pipe or tube.

Figure 3:
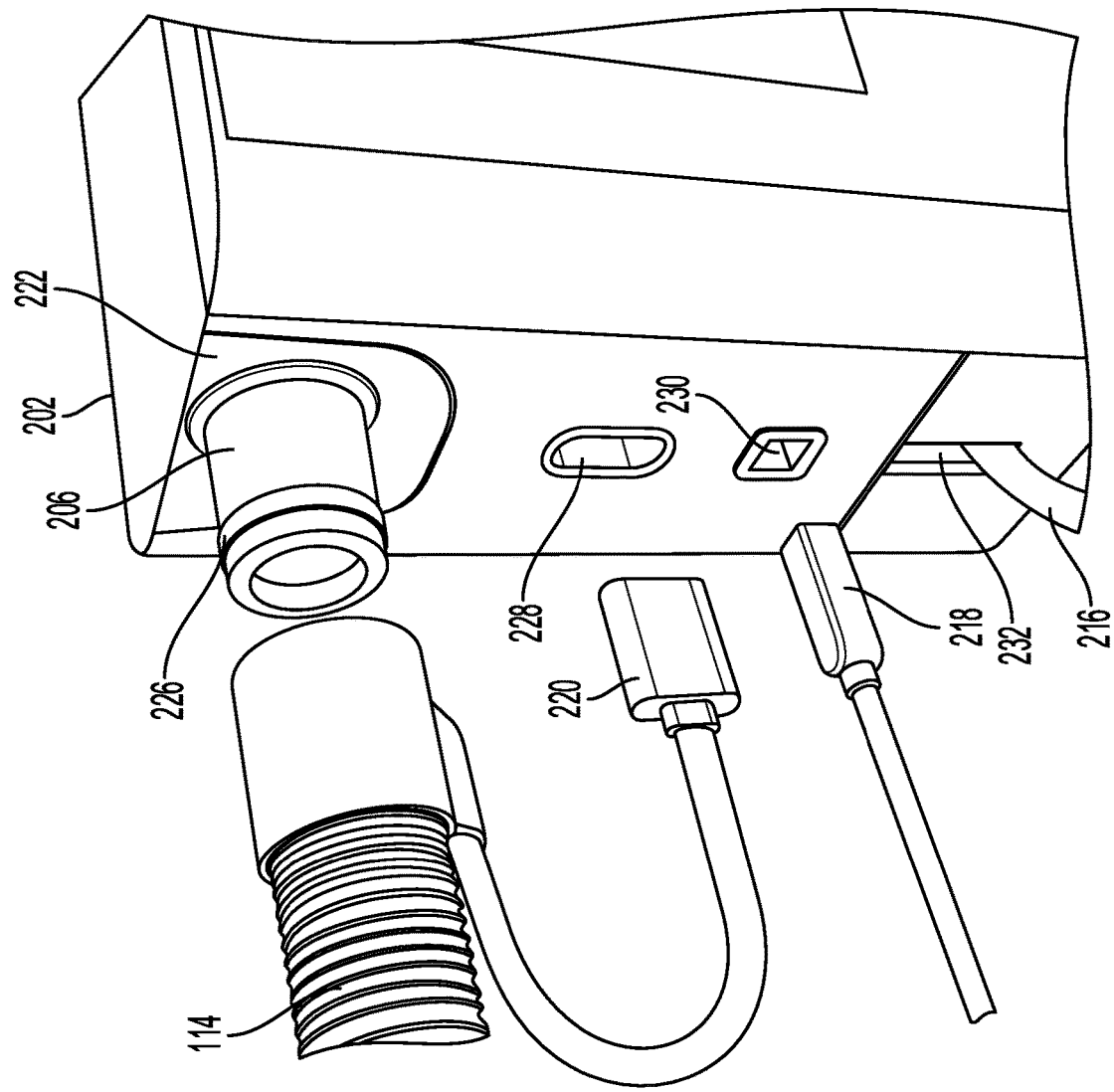
FIG. 3 depicts a side of the example low-profile humidifier.

FIG. 3 depicts a side of the example low-profile humidifier 202. The various electrical ports of the left side of the low-profile humidifier 202 and the gas outlet 206 can be more clearly seen in FIG. 3. The gas outlet 206 is a tubular protrusion from the planar side of the low-profile humidifier 202. The inspiratory conduit 114 slides over the gas outlet 206 to connect to the low-profile humidifier 202. The gas outlet 206 includes a color indicator 226 that indicates which conduit is to be attached to the gas outlet 206. The inspiratory conduit 114 may have a color that matches the color of the outlet color indicator 226. Such coordination helps clinicians correctly connect the proper conduits to the correct ends of the low-profile humidifier 202. The outlet color indicator 226 may also be a gasket that helps seal the connection between the inspiratory conduit 114 and the gas outlet 206.

An inspiratory electrical port 228 may also be included to receive the data and heater wire cable 220. An expiratory electrical port 230 is also included to receive the expiratory heater cable 218. An electrical power port 232 may also be included to receive the power cord 216. The data and heater wire cable 220, expiratory heater cable 218, and/or the power cord 216 may be removed or unplugged from the low-profile humidifier 202. The various electrical ports may also be color coded to match the color of the corresponding electrical cable. For instance, the inspiratory electrical port may have a color that matches a color of the data and heater wire cable 220. Similarly, the expiratory electrical port 230 may have a color that matches a color of the expiratory heater cable 218.

FIG. 4 depicts another side of the example low-profile humidifier 202. In some examples, all the electrical ports may be included on a single planar side of the low-profile humidifier 202. Accordingly, the side depicted in FIG. 4 (e.g., the right side) may not have any electrical ports where the electrical ports are provided on the opposite side (e.g., the left side).

The configuration of the gas inlet 204 can be more clearly seen in FIG. 4. Like the gas outlet 206, the gas inlet 204 also includes a color indicator 234. The inlet color indicator 234 is a different color than the outlet color indicator 226. The inlet color indicator 234 matches the color of the inspiratory conduit 112 to assist with attaching the proper conduit to the gas inlet 204. The inlet color indicator 234 may also be part of a gasket that helps seal the connection between the gas inlet 204 and the inspiratory conduit 112. In some examples, the inspiratory conduit 114 will not fit the gas inlet 204 and the inspiratory conduit 112 will not fit the gas outlet 206. In addition, by having the electrical ports, such as the inspiratory electrical port 228, located only on the side of the low-profile humidifier 202 with the gas outlet 206, the short data and heater wire cable 220 is only able to reach the inspiratory electrical port 228 when the inspiratory conduit 114 is connected to the gas outlet 206. For example, if the inspiratory conduit 114 was connected to the gas inlet 204, the data and heater wire cable 220 could not be plugged in and the clinician would be aware that the inspiratory conduit 114 is connected to the wrong pneumatic port of the low-profile humidifier 202.

The indicators and other preventative measures encourage proper connections of the conduit. In addition, due to the linear configuration of the removable flow channel 222, the directionality of the flow of gas through the low-profile humidifier 202 is readily apparent. This is in stark contrast to other humidifiers where inlets and outlets are provided at the top or the same side of the humidifier. There is no apparent or easily discernable way to tell how the gases flow through such devices, and the likelihood of incorrectly connecting the conduits therefore increases. With the present technology, the likelihood of correctly connecting the conduits increases. Moreover, if the conduits are connected in reverse order such that gases flow through the low-profile humidifier 202 in the opposite direction, the low-profile humidifier 202 detects the negative or opposite flow and issues an alarm or notification.

Figure 5:
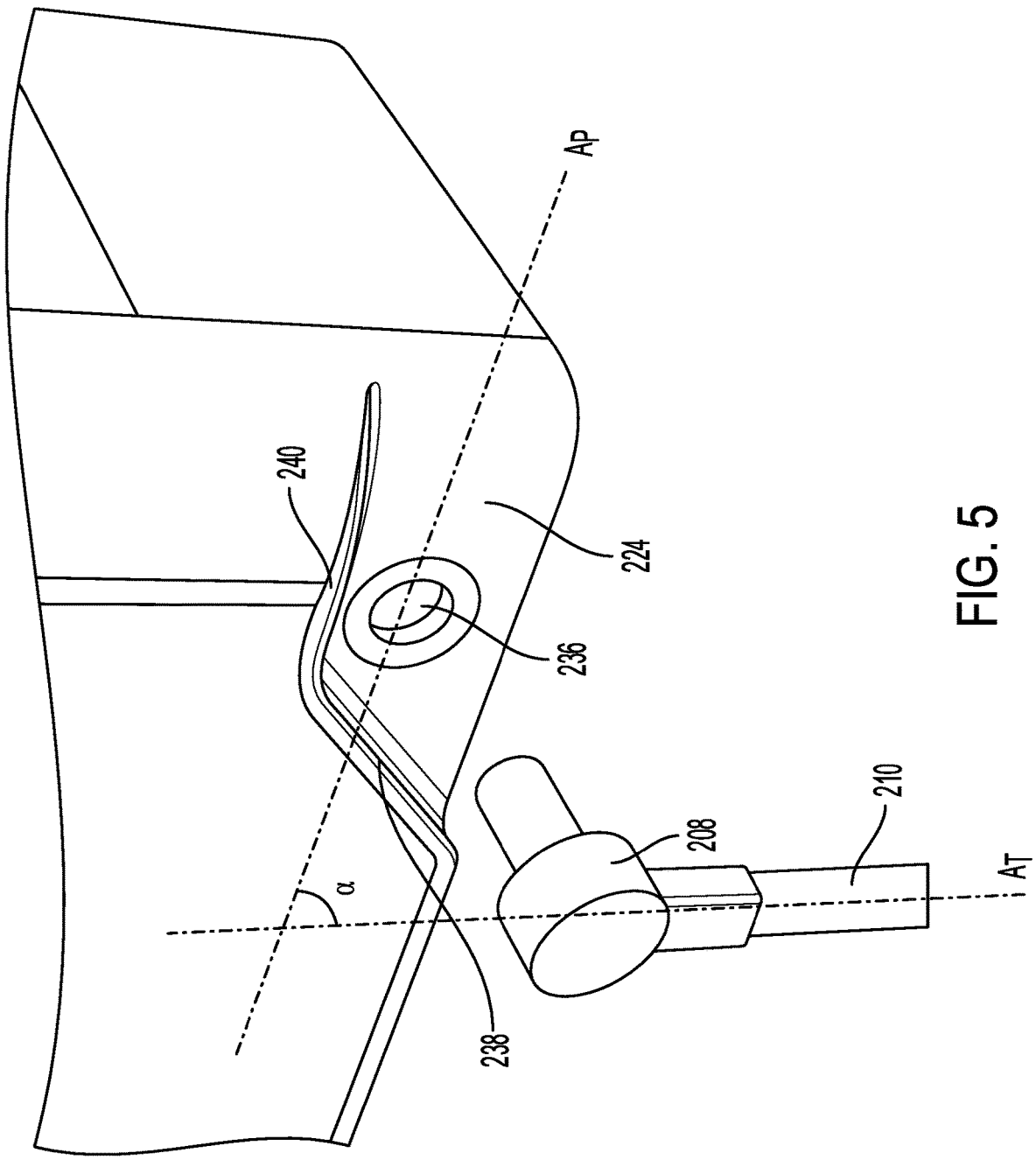
FIG. 5 depicts a lower corner of the example low-profile humidifier.

FIG. 5 depicts a lower corner of the example low-profile humidifier 202 containing the liquid port indentation 224. The recess or indentation 224 includes a planar portion that is offset from and substantially parallel with the planar surface of the front face. That planar portion includes a liquid port 236 for receiving the liquid connector 208 so that liquid can flow into the low-profile humidifier 202.

The indentation includes a first angled wall 238 and a second wall 240 extending substantially parallel to a plane of the bottom side of the low-profile humidifier 202. The first wall 238 is angled such that it extends upwards from the bottom edge of the front face and towards the side of the low-profile humidifier 202 including the indentation 224. The second wall 240 extends from the end of the first wall 238 to the side of the low-profile humidifier 202.

The first wall 238 and the second wall 240 prevent the liquid connector 208 from being installed at some angles. For instance, the positions of the first wall and the second wall cause the liquid connector 208 to be connected such that the liquid tube 210 generally extends downward from the liquid port 236. For instance, a port axis ($A_P$) may be defined as an axis that is parallel to a bottom edge of the low-profile humidifier 202 and running through the center of the liquid port 236. The liquid tube 210 may also have a tube axis ($A_T$) that extends through first few inches of the liquid tube 210 from the connector 208. The angle (α) between the port axis ($A_P$) and the tube axis ($A_T$), measured in a clockwise direction, may be constrained by the first wall 238 and the second wall 240 to be positive. For instance, the first wall and the second wall may constrain the angle (α) to be between about 0-120 degrees. Accordingly, the walls restrict the position of the liquid connector 208, when connected to the liquid port 236, such that the liquid tube 210 coupled to liquid connector 208 extends downward or away from the humidifier body.

By constraining the liquid tube 210 to generally extend downwards from the liquid port 236 during operation, any drops of liquid that escape the port 236 are more likely to be drawn by gravity away from the center of the low-profile humidifier 202 where the electronics are housed. The walls 238, 240 also prevent leaked liquid from moving upwards or inwards on the low-profile humidifier 202. Thus, the leaked liquid flows back to the bottom of the low-profile humidifier 202. Placing the liquid port 236 in the bottom corner of the low-profile humidifier 202 also allows for the shortest distance of travel for any leaked liquid to reach a perimeter edge of the low-profile humidifier 202 when flowing due to gravity.

Figure 6:
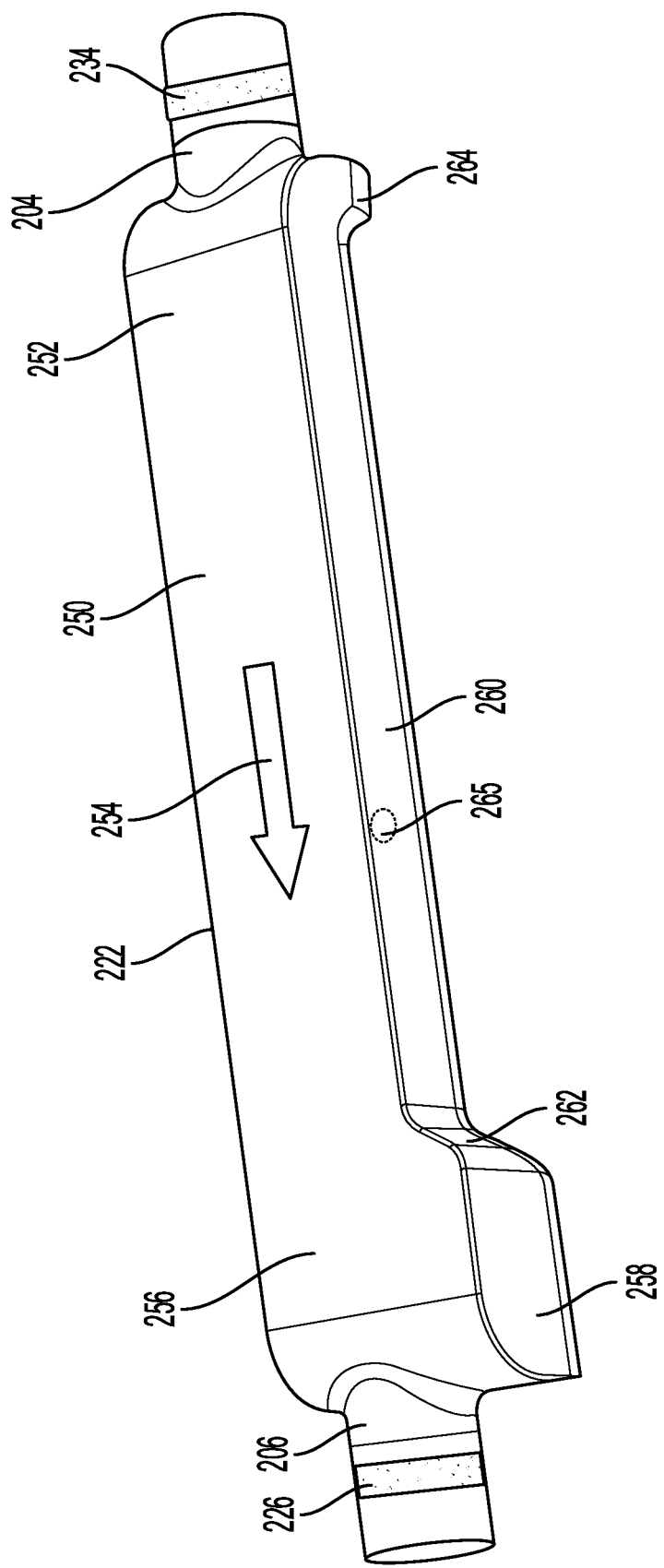
FIG. 6 depicts an example removable flow channel.

FIG. 6 depicts the example removable flow channel 222 having been removed from the remaining body of the low-profile humidifier 202. During operation, the removable flow channel 222 may be held in place through mechanical components (e.g., snap fit, a latch, etc.) and/or magnetic components that hold the removable flow channel 222 in place. Releasing the removable flow channel 222 so that it can be removed may include releasing a latch or similar device. In other examples, a sufficiently large force removes the removable flow channel 222 from the low-profile humidifier 202.

The removable flow channel 222 has an elongate shape with a top surface 250 that may include several indicators for returning the removable flow channel 222 into the correct position in the low-profile humidifier 202. For instance, the outlet side of the removable flow channel 222 includes a lung or patient indicator 256, and the inlet side of the removable flow channel 222 includes ventilator indicator 252. A directional indicator (e.g., arrow 254) indicating the direction of gas flow may also be provided on the top surface 250.

The shape of the removable flow channel 222 may also prevent the removable flow channel 222 from being installed in the incorrect orientation within the low-profile humidifier 202. For instance, the low-profile humidifier 202 may include asymmetrical alignment protrusions that only allow for the removable flow channel 222 to be installed in one orientation (i.e., the correct orientation). As an example, a forward protrusion 258 that protrudes in a back-to-front direction and a downward protrusion 264 may be included that align with matching recesses of the remaining body of the low-profile humidifier 202. The forward protrusion 258 extends forward from a planar front surface 260. As such, an angled wall 262 connects the front planar surface of the forward protrusion 258 and the remaining planar surface of the removable flow channel 222. The downward extension 264 similarly extends downward from a bottom surface of the removable flow channel 222. The extensions or protrusion 258, 264 are asymmetric such that they exist only on one side of the removable flow channel 222 to prevent improper installation of the removable flow channel 222 in the low-profile humidifier 202. Such a connection also provides for the inlet sensors, heaters, and other components to be properly positioned.

As discussed further below with respect to FIGS. 8A-8B, the underside of the removable flow channel 222 may include a through hole 265. The through hole 265 is configured to receive a nozzle protruding from the body of the humidifier 202 when the removable flow channel 222 is connected to the body of the humidifier 202.

Figure 7:
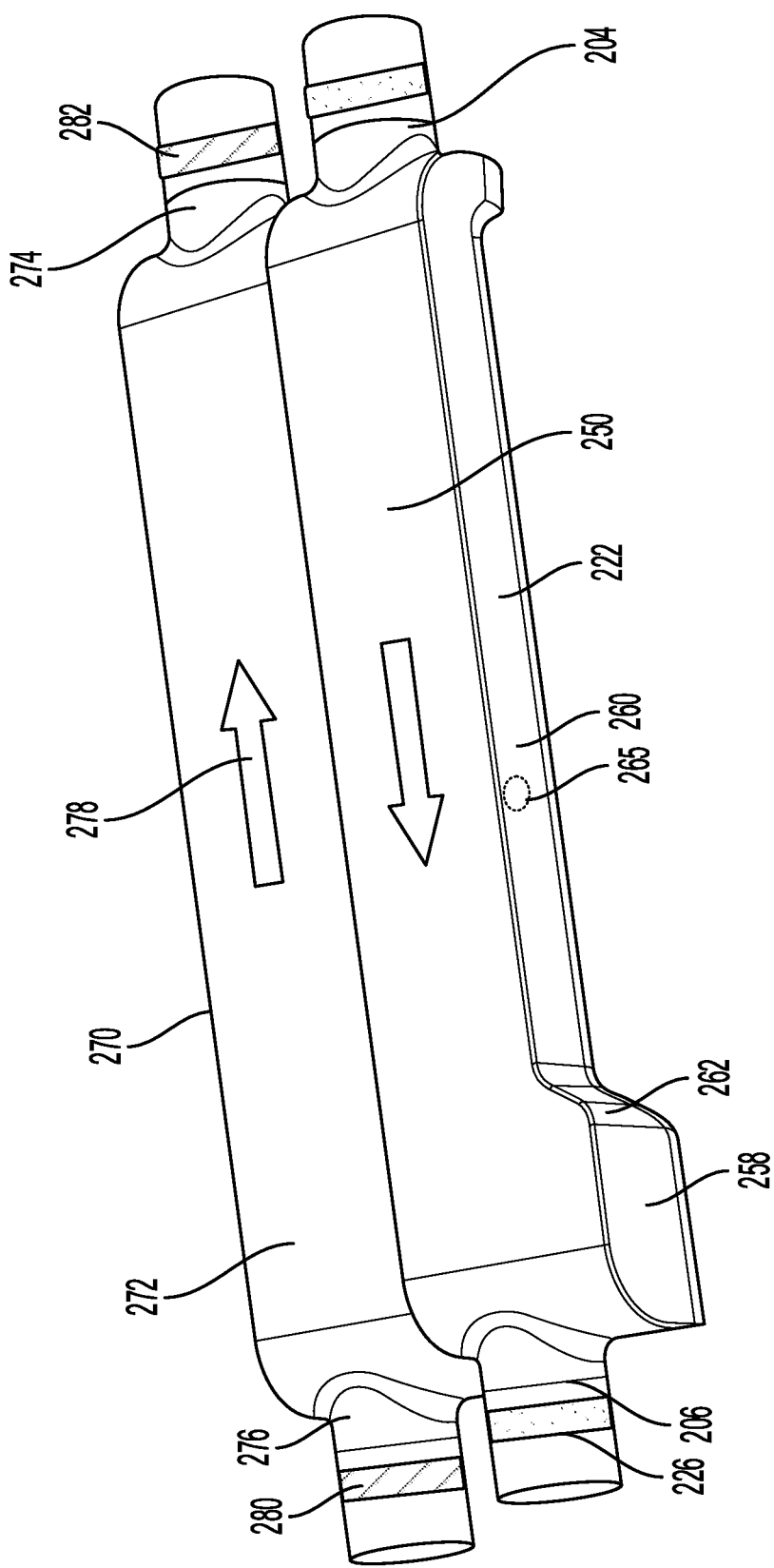
FIG. 7 depicts an example removable flow channel and an example expiratory heat-boost flow channel.

FIG. 7 depicts the example removable flow channel 222 and an example removable expiratory heat-boost flow channel 270. While not depicted in FIGS. 1-6, the low-profile humidifier 202 may include an expiratory heat-boost flow channel 270 that receives and heats gases that are exhaled by the patient. For instance, the expiratory heat-boost flow channel 270 may include an exhaled gas inlet 276 and an exhaled gas outlet 274. In the example shown, the exhaled gases flow through the expiratory heat-boost flow channel 270 in direction opposite that of the breathing gases flowing through the removable flow channel 222.

Similar to the removable flow channel 222, the expiratory heat-boost flow channel 270 may be removable from the low-profile humidifier 202. The expiratory heat-boost flow channel 270 may also be sterilizable or autoclavable. The expiratory heat-boost flow channel 270 and the removable flow channel 222 may be installed such that they are in contact with one another and the top surfaces of the expiratory heat-boost flow channel 270 and the removable flow channel 222 are parallel with one another. For instance, a top surface 272 of the expiratory heat-boost flow channel 270 may be parallel with the top surface 250 of the removable flow channel 222 when the removable flow channel 222 and the expiratory heat-boost flow channel 270 are installed in the low-profile humidifier 202.

The expiratory heat-boost flow channel 270 may also include indicators or markings similar to that of the removable flow channel 222. For instance, the top surface 272 may include an arrow indicator 278 indicating the direction of flow of the exhaled gases. A color indicator 280 may be provided on the exhaled gas inlet 276, and another color indicator 282 may be provided on the exhaled gas outlet 274. The color indicators 280, 282 may be different colors that match colors of corresponding conduits that are to be attached to the exhaled gas inlet 276 and the exhaled gas outlet 274 respectively. The color indicators 280, 282 may also form gaskets. In some examples, however, the direction of gas flow through the expiratory heat-boost flow channel 270 may not matter. For instance, the expiratory heat-boost flow channel 270 may not have directional components. Instead, the expiratory heat-boost flow channel 270 may be primarily a heated tube that heats the gases flowing therethrough no matter the orientation. In such examples, the expiratory heat-boost flow channel 270 may be symmetric such that it can be connected in either orientation and the indicators/marking showing directionality may be omitted.

The exhaled gas inlet 276 connects to an expiratory conduit of the breathing circuit that carries exhaled gases from the patient. The exhaled gas outlet 274 connects to another segment of an expiratory conduit that carries the gases to the expiratory port of the ventilator. In some examples, the expiratory heat-boost flow channel 270 may reach temperatures in excess of 50, 60 or 70 degrees Celsius to quickly boost the temperature of the exhaled gases. Due to the high heat, the exhaled gas outlet 274 (and in some examples the exhaled gas inlet 276) may include a silicon or other heat insulating component to help prevent the potential to melt the expiratory conduits to which the expiratory heat-boost flow channel 270 connects.

In some examples, the expiratory heat-boost flow channel 270 may include one or more temperature sensors (e.g., thermistors). For instance, a first temperature sensor may be included near the exhaled gas inlet 276 to measure the temperature of the exhaled gases entering the expiratory heat-boost flow channel 270. A second temperature sensor may be included near the exhaled gas outlet 274 to measure the temperature of the gases leaving the expiratory heat-boost flow channel 270.

While the gases pass through the expiratory heat-boost flow channel 270, the expiratory heat-boost flow channel 270 rapidly heats the exhaled gases. For instance, the expiratory heat-boost flow channel 270 includes a metallic tube that is heated by a heater of the low-profile humidifier 202. The metallic tube transfers energy to the exhaled gases to increase the temperature of the exhaled gases. Increasing the temperature of the exhaled gases reduces the likelihood that rainout or condensation will occur in the expiratory limb(s).

When a rainout event occurs that interferes with ventilation and/or has the potential to have a negative effect on the patient, the water must be emptied from the breathing circuit and/or the breathing circuit must be changed. Disconnection of the breathing circuit while the patient is undergoing ventilation also has its own negative effects. Such disconnection may result in decruitment or atelectasis of the lung. In addition, disconnecting or opening the breathing circuit may expose the air in the room to any pathogens that are in the breathing circuit. Moreover, the condensation itself may increase the likelihood and/or rate of growth of such pathogens.

The condensation or rainout forms where the temperature of the humidified breathing gases drops below its dew point. Accordingly, heating the breathing gases to prevent such drops in temperature is one way to prevent rainout. Heating of the breathing gases, however, has several limitations. For instance, there is a desired temperature for the breathing gases to be delivered to the patient (e.g., a patient-specific temperature). In simple terms, delivering gases that are too hot may cause discomfort or injury to the patient. Similarly, increasing the temperature of conduits or portions of the breathing circuit that are close to the patient's face or in positions within the patient's reach may create potential dangers for the patient. In addition, heating the breathing gases near a patient, even exhaled gases, may create a risk of rebreathing those gases or having heat transfer to inhaled breathing gases.

The present expiratory heat-boost flow channel 270 allows for heating breathing gases in manner that substantially reduces the likelihood of rainout while still protecting the patient and breathing gases from the negative effects of heating discussed above. During ventilation, breathing gases are most likely to rainout in the expiratory limb at positions that are further from the patient. For instance, as the exhaled gases travel from the patient back to the ventilator, the exhaled gases lose heat. If enough heat is lost for the breathing gases to drop below their dew point, rainout may occur.

The expiratory heat-boost flow channel 270 creates a boost zone of extra heat into the exhaled gases at a position on the humidifier, which is often closer to the ventilator than the patient. By incorporating the expiratory heat-boost flow channel 270 in such a manner, the breathing gases can be heated to temperatures that would be unsuitable for breathing because the possibility of such gases being breathed by the patient are incredibly low. In addition, heating of the boost-heated expiratory extension at a position that is closer to the ventilator also reduces the likelihood that the patient will come into physical contact with the expiratory heat-boost flow channel 270. In addition, the heat that is already generated from the humidifier 202 to humidify the breathing gases flowing through the removable flow channel 222 can also be used to heat the expiratory heat-boost flow channel 270. As an example, the heater(s) used to heat the removable flow channel 222 may also be used to heat the expiratory heat-boost flow channel 270. For instance, waste heat that is generated from the various components of the humidifier 202 (e.g., pump, electronics, etc.) can be directed into the expiratory heat-boost flow channel 270, which provides an increase in overall efficiency of the system.

Figure 8A:
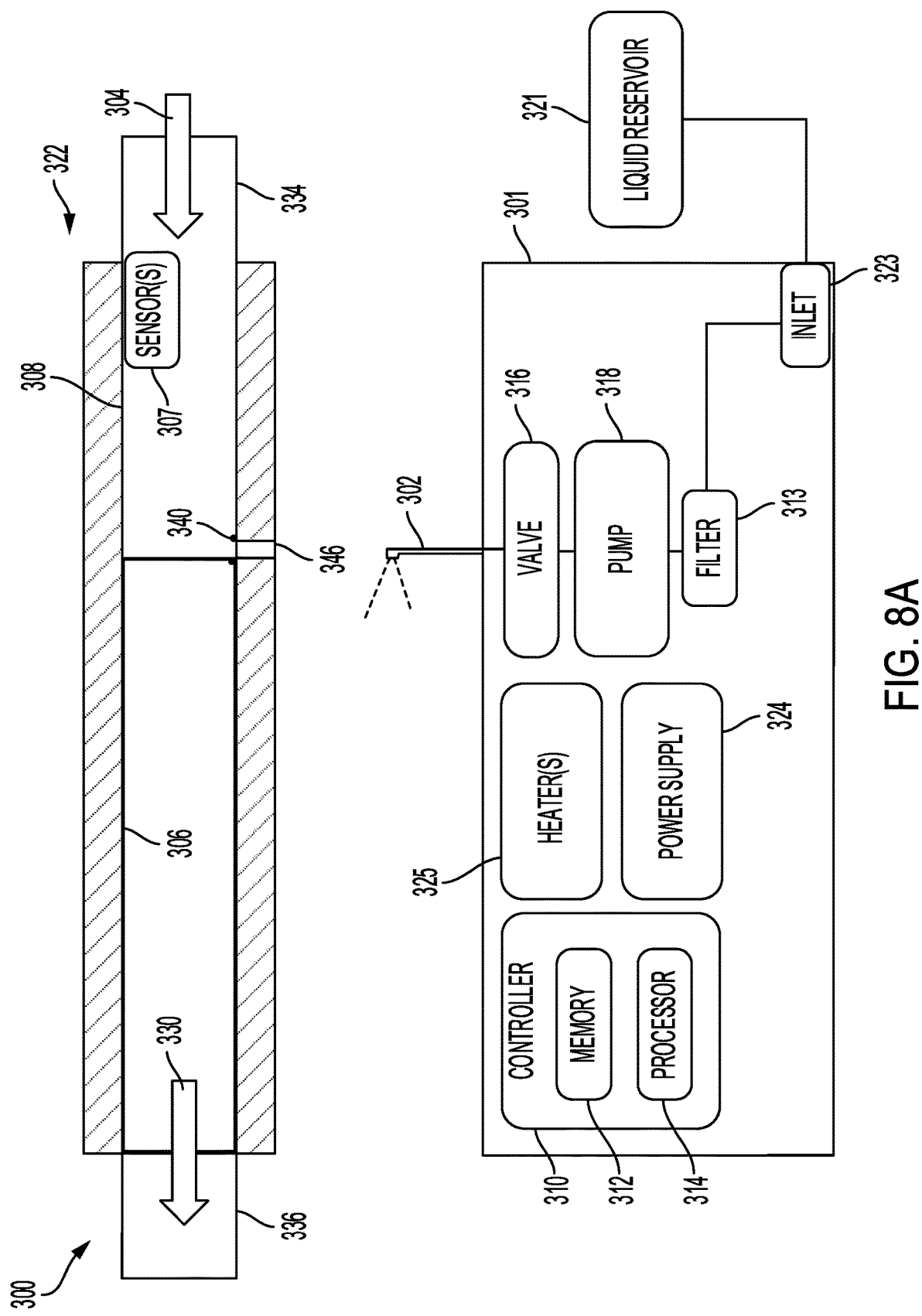
FIG. 8A depicts a partial, cross-sectional schematic diagram illustrating an example low-profile humidifier with the removable flow channel removed from a body of the low-profile humidifier.
Figure 8B:
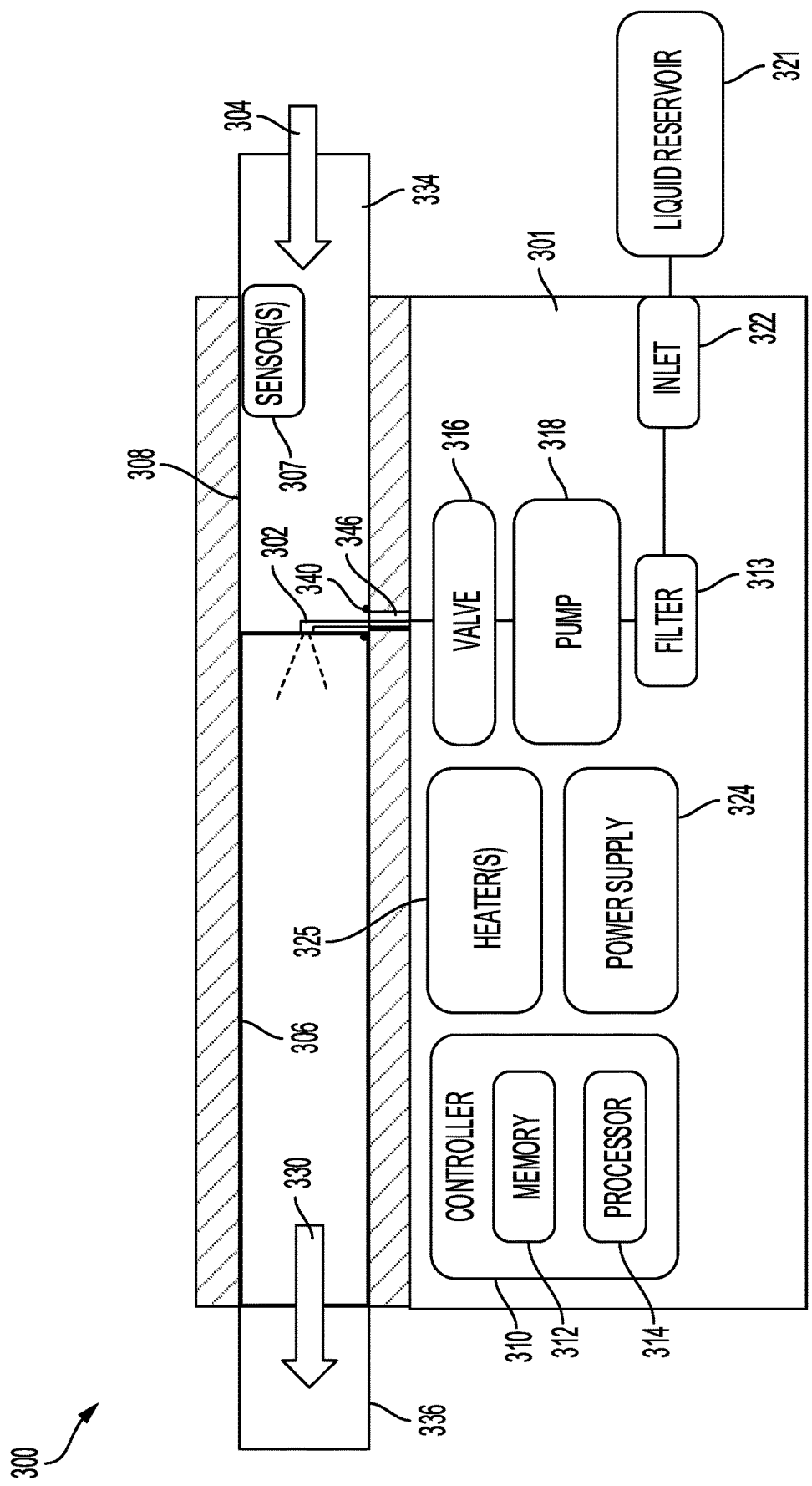
FIG. 8B depicts the partial, cross-sectional schematic diagram of FIG. 8A illustrating an example low-profile humidifier with the removable flow channel installed in the body of the low-profile humidifier.

FIG. 8A depicts a partial, cross-sectional schematic diagram illustrating an example low-profile humidifier 300 with the removable flow channel 322 removed from a body 301 of the low-profile humidifier 300. FIG. 8B depicts the partial, cross-sectional schematic diagram of FIG. 8A illustrating an example low-profile humidifier 300 with the removable flow channel 322 installed in the body 301 of the low-profile humidifier 300. FIGS. 8A-8B are discussed concurrently.

The body 301 of the humidifier 300 includes a liquid-injection nozzle 302 that is positionable within conduit 308 of the removable flow channel 322 when the removable flow channel 322 is installed in the body 301 of the humidifier 300. The liquid-injection nozzle 302 is then in a flow path 304 of breathing gases during ventilation of a patient. The nozzle 302 may be configured to inject liquid (e.g., water and/or medicine) in one of a variety of patterns, including a jet, a full cone, a hollow cone, a fan shape, etc. The liquid may be injected as a stream of liquid or as atomized droplets. The properties of the injected liquid (e.g., stream versus droplet along with droplet size) may be based on the pressure of the liquid that is injected, the frequency at which the liquid is injected, and/or the size and configuration of the apertures in the nozzle 302. For instance, in an example the tip of the nozzle 302 may include one or more small holes or apertures that causes pressurized water to atomize when passing through the small holes. In other examples, the atomizer may include a hole or aperture for providing a jet of water. An elongated aperture may also or alternatively be included to provide the fan-shaped pattern of the injected water. In some examples, the nozzle 302 may include a micro-perforated membrane to inject liquid through the plurality of micro-perforations.

The removable flow channel 322 may also include a heated tube 306 or other heated surface that causes the liquid injected from the liquid-injection nozzle 302 to vaporize on contact. The heated tube 306 may include a heating element and a thermally conductive material, such as aluminum, silver, copper, or other suitable metal or alloy (which, in some cases may be thinly plated with nickel to prevent corrosion). The heating element may generate thermal energy via any suitable means, e.g., electrical, chemical, or otherwise, and may deliver the thermal energy to the heated surface 306 via any suitable means (e.g., via an external sleeve or blanket, internal or external wiring, etc.).

Once the injected liquid is vaporized, the evaporated liquid then mixes with the breathing gases in the flow path 304 to form humidified breathing gases 330. For instance, breathing gases enter a gas inlet 334 and are humidified within the conduit 308. The humidified breathings gases then exit the removable flow channel 322 through a gas outlet 336 where the humidified breathing gases enter an inspiratory limb of a breathing circuit and are ultimately carried to the patient.

The heated tube 306 may heat quickly, e.g., in one minute or less, and may be controlled by a heater 325 of the humidifier 300 to rapidly achieve a desired temperature of the breathing gases within the conduit 308. As such, humidifier 300 requires very little start up time for humidifying the breathing gas.

In the example depicted, the nozzle 302 is positioned to inject liquid directly into the flow path 304 of the breathing gases, and those breathing gases may exhibit variable initial humidity levels before entering the humidifier 300. For instance, where the breathing gas source is dry, such as from bottled gases, hospital wall gases, or gases from a compressor with dryer, then a greater amount of water may need to be injected into the breathing gas stream than would be the case, for example, if the breathing gas source is from a blower-based system that provides gases at an ambient humidity level.

In some aspects, the temperature of the heated surface 306 is maintained using closed-loop control by a controller 310 to a level whereby the liquid ejected from the nozzle 302 is vaporized, and a temperature of the humidified breathing gases 330 is regulated to maintain the water vapor in the breathing gases delivered to the patient at a user-selected humidity. For instance, in examples without a heated inspiratory limb, for a target temperature of the delivered breathing gases of 37 degrees C., the humidified breathing gases leaving the humidifier may be about 45 degrees C. to account for cooling in the inspiratory limb of the patient circuit. In other aspects, the temperature of the heated tube 306 is significantly hotter than needed for vaporization in order to raise the temperature of the humidified breathing gases 330 to a desired temperature sufficient to maintain the water vapor in the breathing gases at a user-selected humidity when cooling occurs in the ventilation tubing system.

The humidifier body 301 may also include one or more heaters 325, such as a heater 325 to heat the heated tube 306 and, where utilized, an expiratory heat-boost flow channel. The heaters 325 may include a heater for the heated tube 306, a heater for the heater wire of the inspiratory limb, a heater for the heater wire of the expiratory limb, and/or a heater for the expiratory heat-boost flow channel where used. The humidifier body 301 may also include a power supply 324 that provides converts power received from the power cord to powers (e.g., voltages and currents) that may be used by the components of the humidifier 300, such as the controller 310, the pump 318, and the valve 316.

In some aspects, the humidifier 300 also includes a liquid reservoir 321, a liquid pump 318 and a valve 316, which are in fluid communication with the nozzle 302. For example, the liquid pump 318 pumps liquid from the liquid reservoir 321 towards the nozzle 302 through valve 316. The liquid pump 318 may be outside of the flow of ventilator gases. Accordingly, portions of the humidifier 300 that are exposed to the flow of gases may be separated from the pump 318 for cleaning. The pump 318 may also be capable of pumping fluid through the fluid line without components of the pump 318 coming into fluidic contact with the fluid. For instance, the pump 318 may be a tube pump, such as a peristaltic pump, a full-press ring pump, a mid-press ring pump, or other pump configured to pump a fluid without components of the pump coming into fluidic contact with the fluid. In such examples, the pump 318 may not contact the breathing gases or the fluid that is being pumped, which results in the pump remaining relatively clean and not necessarily requiring sterilization between patients.

The liquid reservoir 321, such as an intravenous (IV) bag of distilled water or other suitable liquid supply, supplies liquid at ambient pressure to the pump 318. In some cases, a medication may be dissolved in the liquid reservoir 321, e.g., dissolved in the intravenous (IV) bag.

An outlet of the pump 318 may be directed to the valve 316. In some aspects, the valve 316 is a fast-response solenoid valve that delivers the pressurized liquid from the pump 318 to the nozzle 302. In other examples, the valve 316 may be omitted and control of the fluid to the nozzle 302 may be controlled directly by the pump 318. For instance, activation of the pump causes liquid to flow to the nozzle 302, and deactivation of the pump 318 reduces the pressure of the liquid against the nozzle 302. In such examples, the nozzle 302 may include a membrane that allows fluid to be injected only at pressures above a pressure threshold. Thus, activating the pump 318 causes the fluid pressure to exceed the threshold and liquid to be injected from the nozzle 302. When the pump 318 is deactivated, the pressure of the liquid drops as the liquid is injected through the nozzle 302 until the liquid pressure is below the pressure threshold and liquid substantially ceases to flow through the membrane.

The controller 310 may include memory 312 and at least one processor 314. Controller 310 may be operative to receive an inspiratory flow command from the ventilator (e.g., ventilator 100) and may command valve 316 and/or pump 318 to deliver an amount of fluid, such as water or medicine, sufficient to maintain a user-selected relative humidity of the breathing gases. The amount of fluid may be calculated to be sufficient to maintain the user-selected relative humidity of the breathing gases and/or to deliver a prescribed amount of the medicine based on a concentration of the medicine in the fluid. In aspects, a concentration of the medicine in the fluid may be adjusted based on the amount of water calculated to maintain the desired humidity.

As an example, controller 310 may command valve 316 and/or pump 318 using pulse width modulation (PWM) or some other suitable driving method to provide "bursts" of water to the nozzle 302. In these aspects, the duration and timing of bursts (as controlled by the opening and closing of the valve 316 and/or activating and deactivating the pump 318) provides a prescribed amount of pressurized liquid to the nozzle 302. These controlled bursts or pulses allow the nozzle 302 to inject a specific amount of liquid to the heated surface 306, thereby preventing or reducing over or under humidification as well as delivering a prescribed amount of a dissolved medicine, if desired.

In some examples, the width of the electric pulses that trigger the bursts of water may be less than 200 milliseconds, 100 milliseconds, less than 50 milliseconds, and/or between 5-50 milliseconds. For instance, the burst of liquid may last 5-50 milliseconds. In some examples, such as where a hollow cone atomizer is used for the nozzle 302, the pressures of the liquid may be quite high and in excess of 250 pounds per square inch (PSI), 300 PSI, and/or 350 PSI. In other examples, where different water injection patterns are used (e.g., fan shape, full cone, etc.), lower pressures may be used, such as less than 200 PSI, between 50-100 PSI, and/or between 50-150 PSI. For instance, a flat or fan shaped spray pattern may allow for lower pressures to be used as compared to a hollow-cone shaped spray pattern. The lower pressure requirements allow for a larger variety of pumps to be implemented, such as a peristaltic pump as discussed above.

Each burst of water delivers a precise amount of water into the patient circuit. Thus, based on the configuration of the nozzle 302 (e.g., aperture size, number, and configuration), the burst duration, and the liquid pressure, the amount of liquid delivered to the patient circuit may be calculated and/or determined. Accordingly, the amount of liquid from the humidifier that is delivered to the patient may be determined on a continuous basis, such as on a breath-by-breath basis. The amount of water may also be determined in real-time and based on ventilation. For instance, a first amount of water may be injected during an inhalation phase of a breath and a second amount of water may be injected during an exhalation phase of the breath.

Additionally, the nozzle 302 may be configured to spray or inject liquid in spray patterns of small water droplets at a low flow rate. The low flow rate further enables the nozzle 302 to prevent or reduce over humidification by having a higher resolution of the amount of liquid that is injected into the system.

In some aspects, to achieve a desired humidity, the water flow rate is dependent on flow rate of breathing gases flowing through the humidifier 300. For instance, an average water flow rate as low as 0.04 ml/min may be delivered at a gas flow rate of 1 liters/min; whereas an average water flow rate as high as 9 ml/min may be delivered at a gas flow of 200 liters/min. Accordingly, the humidifier 300 may be designed to have the capability of providing a fluid flow rate of at least 9 ml/min so it can accommodate a gas flow rate of 200 liters/min. Thus, to accommodate lower gas flow rates, the solenoid valve may be pulsed with shorter durations and/or longer intervals between pulses to deliver less liquid flow. In this case, the nozzle 302 may deliver pulses of liquid at 30 ml/min timed and spaced to provide an average liquid flow rate of 1 ml/min.

In general, the nozzle 302 may be configured to deliver a liquid flow rate from 0.1 to 40.0 ml/min to breathing gases in the flow path 304 exhibiting a gas flow rate from 1 to 200 liters/min. These fluid flow rates are provided as examples and not meant to be limiting. Other suitable liquid flow rates for use with the humidifier 300 will be appreciated by a person of skill in the art in light of this disclosure.

In some aspects, the humidifier 300 also includes a water filter 313. The water filter 313 prevents small debris from entering the pump 318, the valve 316, and/or the nozzle 302 by filtering out any debris from the liquid reservoir 321. As illustrated, the water filter 313 is located upstream of the pump 318, the valve 316, and the nozzle 302. For instance, liquid is received into the humidifier body 301 from a liquid reservoir 321 via a port or inlet 323. That liquid is then filtered by the filter 313 before reaching the pump 318. In other examples, the water filter 313 may be located downstream of the pump 318 and upstream of the valve 316 and the nozzle 302.

As illustrated, the humidifier 300 may also include one or more sensors 307 within the removable flow channel 322. The sensors may include a flow sensor, a temperature sensor, and/or humidity sensor located in flow path 304 upstream of the nozzle 302. The sensor(s) 307 may be communicatively coupled to humidifier body 301 when the removable flow channel 322 is coupled to the humidifier body 301. Thus, the sensor(s) 307 may provide temperature, humidity, and/or gas flow measurements to controller 310, which may then command the heated surface or tube 306 (and/or a heating element/wire of a heated breathing circuit or inspiratory limb) to maintain a desired temperature and/or humidity of the breathing gases flowing through flow path 304. Additional aspects of humidification systems and components that may be appropriate for incorporation into the low-profile humidifier discussed herein are described in U.S. application Ser. No. 17/465,517, titled "Systems and Methods for Active Humidification in Ventilatory Support" and filed on Sep. 2, 2021, which is herein incorporated by reference in its entirety.

To assist in connection and disconnection of the removable flow channel 322 with the humidifier body 301, the bottom side of the removable flow channel 322 includes a through hole 346 that is open to the flow path of gases in the lumen formed by the conduit 308. When the removable flow channel 322 is connected to the body 301, the nozzle 302 slides through the through hole 346 and into the flow path of the breathing gases. An O-ring or gasket 340 may be provided around the through hole 346 to help form a seal around the nozzle 302 when the removable flow channel 322 is connected to the humidifier body 301. Electrical connections may also be provided on the bottom of the removable flow channel 322 to mate or connect with electrical connections on the body 301. For instance, electrical connections for sensor communication, heater control and power, etc. may be incorporated.

Those skilled in the art will recognize that the methods and systems of the present disclosure may be implemented in many manners and as such are not to be limited by the foregoing aspects and examples. In other words, functional elements being performed by a single or multiple components, in various combinations of hardware and software or firmware, and individual functions, can be distributed among software applications at either the client or server level or both. In this regard, any number of the features of the different aspects described herein may be combined into single or multiple aspects, and alternate aspects having fewer than or more than all of the features herein described are possible.

Functionality may also be, in whole or in part, distributed among multiple components, in manners now known or to become known. Thus, a myriad of software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software firmware components described herein as would be understood by those skilled in the art now and hereafter. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Numerous other changes may be made which will readily suggest themselves to those skilled in the art and which are encompassed in the spirit of the disclosure and as defined in the appended claims. While various aspects have been described for purposes of this disclosure, various changes and modifications may be made which are well within the scope of the disclosure. Numerous other changes may be made which will readily suggest themselves to those skilled in the art and which are encompassed in the spirit of the disclosure and as defined in the claims.

What is claimed is:

1. A low-profile humidifier for humidifying breathing gases from a medical ventilator, comprising:
   a humidifier body, comprising:
      a liquid port;
      a pump in fluid communication with the liquid port;
      a valve in fluid communication with the pump;
      a nozzle in fluid communication with the valve;
      a controller that controls the valve and the pump;
   a removable flow channel that is removable from the humidifier body, the removable flow channel comprising:
      a gas inlet sized for connection to a conduit from a medical ventilator;
      a gas outlet;
      a conduit between the gas inlet and the gas outlet;
      a heated surface within the conduit to vaporize liquid droplets injected by the nozzle; and
      a through hole to receive the nozzle into the conduit.

2. The low-profile humidifier of claim 1, wherein a top surface of the removable flow channel forms a portion of a top surface of the humidifier body.

3. The low-profile humidifier of claim 1, wherein the removable flow channel aligns with the humidifier body asymmetrically.

4. The low-profile humidifier of claim 1, wherein the gas outlet comprises a color indicator of a first color and the gas inlet comprises a color indicator of a second color.

5. The low-profile humidifier of claim 1, wherein the removable flow channel is rigid, opaque, and elongate.

6. The low-profile humidifier of claim 1, wherein the humidifier body includes a front planar surface, and wherein a display is included in the front planar surface.

7. The low-profile humidifier of claim 1, wherein the liquid port is located within an indentation in a lower corner of the humidifier body such that a liquid tube coupled to the liquid port extends downward or away from the humidifier body.

8. A low-profile humidifier for humidifying breathing gases from a medical ventilator, comprising:
   a humidifier body, comprising:
      a housing having a front planar surface, a first side planar surface, a second side planar surface, and a top planar surface, wherein the housing has a volume of less than 150 cubic inches;
      a liquid port couplable to a fluid connector;
      a pump fluidly in fluid communication with the liquid port;
      a valve fluidly in fluid communication with the pump; and
      a nozzle in fluid communication with the valve;
   a removable flow channel that is removable from the humidifier body, the removable flow channel comprising:
      a conduit;
      a heated surface to vaporize liquid droplets injected by the nozzle; and
      a through hole to receive the nozzle.

9. The low-profile humidifier of claim 8, wherein the removable flow channel further comprises at least one of a flow sensor, a temperature sensor, or a humidity sensor.

10. The low-profile humidifier of claim 8, wherein a top surface of the removable flow channel includes an arrow indicting a direction of flow of breathing gases through the removable flow channel.

11. The low-profile humidifier of claim 8, further comprising a removable expiratory heat-boost flow channel including an exhaled gases inlet and an exhaled gases outlet.

12. The low-profile humidifier of claim 8, wherein the liquid port is located within an indentation in a lower corner of the humidifier body such that a liquid tube coupled to the liquid port extends downward or away from the humidifier body.

13. The low-profile humidifier of claim 8, wherein a top surface of the removable flow channel is parallel with the top planar surface of the humidifier body.

14. The low-profile humidifier of claim 8, wherein the removable flow channel includes a gas inlet protruding from the first side planar surface and a gas outlet protruding from the second side planar surface.

15. The low-profile humidifier of claim 14, wherein the second side planar surface includes an inspiratory electrical port to receive a data and heater wire cable for an inspiratory conduit.

* * * * *